US012542088B2

(12) United States Patent
Liu et al.

(10) Patent No.: US 12,542,088 B2
(45) Date of Patent: Feb. 3, 2026

(54) SIGNAL PROCESSING METHOD, DISPLAY APPARATUS, ELECTRONIC DEVICE AND READABLE STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventors: Dong Liu, Beijing (CN); Yanping Liao, Beijing (CN); Xibin Shao, Beijing (CN); Dongchuan Chen, Beijing (CN); Seungmin Lee, Beijing (CN); Guohuo Su, Beijing (CN); Yinlong Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 18/552,533

(22) PCT Filed: Apr. 26, 2022

(86) PCT No.: PCT/CN2022/089394
§ 371 (c)(1),
(2) Date: Sep. 26, 2023

(87) PCT Pub. No.: WO2023/206101
PCT Pub. Date: Nov. 2, 2023

(65) Prior Publication Data
US 2025/0087133 A1 Mar. 13, 2025

(51) Int. Cl.
*G09G 3/20* (2006.01)

(52) U.S. Cl.
CPC ......... *G09G 3/2096* (2013.01); *G09G 3/2074* (2013.01); *G09G 2310/08* (2013.01); *G09G 2340/0407* (2013.01)

(58) Field of Classification Search
None
See application file for complete search history.

(56) References Cited

U.S. PATENT DOCUMENTS

2008/0036703 A1 2/2008 Wang et al.
2008/0079755 A1 4/2008 Shiomi
(Continued)

FOREIGN PATENT DOCUMENTS

CN 101123066 A 2/2008
CN 102087830 A 6/2011
(Continued)

OTHER PUBLICATIONS

Chinese Office Action cited in Chinese Application No. 202280000905.1, with English translation, dated Aug. 6, 2025, 22 pages.

*Primary Examiner* — Andre L Matthews
(74) *Attorney, Agent, or Firm* — LEASON ELLIS LLP

(57) ABSTRACT

A signal processing method, a display apparatus, an electronic device and a computer-readable storage medium are provided. The signal processing method for a display apparatus, the display apparatus includes a display substrate, the display substrate includes M rows and N columns of pixel units arranged in an array, and the signal processing method includes: acquiring display data of a frame of an image to be displayed, wherein the display data include P rows and Q columns of pixel data arranged in an array; generating P rows of gate scan signals corresponding to the P rows of pixel data; in a case where P is less than M, generating M-P rows of supplementary gate scan signals based on the P rows of gate scan signals; and driving the M rows of pixel units
(Continued)

using the M rows of gate scan signals, respectively, P, Q, M and N are all positive integers.

18 Claims, 20 Drawing Sheets

(56) References Cited

U.S. PATENT DOCUMENTS

| | | | | |
|---|---|---|---|---|
| 2011/0134340 | A1 | 6/2011 | Yamashita et al. | |
| 2014/0072232 | A1 | 3/2014 | Zheng et al. | |
| 2016/0117799 | A1 | 4/2016 | Park et al. | |
| 2016/0124536 | A1 | 5/2016 | Hyun et al. | |
| 2016/0155405 | A1* | 6/2016 | Kim | G09G 3/003 345/88 |
| 2016/0180789 | A1* | 6/2016 | Hur | G09G 3/3614 345/100 |
| 2016/0267716 | A1* | 9/2016 | Patel | G06F 3/013 |
| 2017/0193963 | A1 | 7/2017 | Pan et al. | |
| 2019/0147818 | A1* | 5/2019 | Wang | G09G 3/3674 345/204 |
| 2019/0261519 | A1 | 8/2019 | Park et al. | |
| 2020/0051211 | A1 | 2/2020 | Shiokawa et al. | |
| 2021/0090482 | A1 | 3/2021 | Ban et al. | |
| 2021/0193028 | A1 | 6/2021 | Choi | |
| 2021/0343228 | A1 | 11/2021 | Lee | |
| 2022/0292638 | A1 | 9/2022 | Zhang et al. | |

FOREIGN PATENT DOCUMENTS

| | | | |
|---|---|---|---|
| CN | 102196232 | A | 9/2011 |
| CN | 102881000 | A | 1/2013 |
| CN | 105096892 | A | 11/2015 |
| CN | 105487313 | A | 4/2016 |
| CN | 105551455 | A | 5/2016 |
| CN | 105575309 | A | 5/2016 |
| CN | 105654884 | A | 6/2016 |
| CN | 111727423 | A | 9/2020 |
| CN | 112634829 | A | 4/2021 |
| CN | 112634836 | A | 4/2021 |
| CN | 112650460 | A | 4/2021 |
| CN | 113556496 | A | 10/2021 |
| CN | 113570992 | A | 10/2021 |
| JP | 10253939 | A | 9/1998 |

* cited by examiner

SIGNAL PROCESSING METHOD, DISPLAY APPARATUS, ELECTRONIC DEVICE AND READABLE STORAGE MEDIUM

CROSS-REFERENCE TO RELATED PATENT APPLICATIONS

This application is a U.S. National Stage Application under 35 U.S.C. § 371 of International Patent Application No. PCT/CN2022/089394, filed Apr. 26, 2022, which is incorporated by reference in its entirety.

TECHNICAL FIELD

Embodiments of the present disclosure relate to a signal processing method, a display apparatus, an electronic device and a readable storage medium.

BACKGROUND

With the development of the display industry, more and more display apparatuses using display panels as display ports have been integrated into people's work and life, and commonly used display apparatuses include liquid crystal display apparatuses and OLED (Organic Light-Emitting Diode) display apparatuses.

SUMMARY

At least one embodiment of the disclosure provides a signal processing method for a display apparatus, wherein the display apparatus comprises a display substrate, the display substrate comprises M rows and N columns of pixel units arranged in an array, and the signal processing method comprises: acquiring display data of a frame of an image to be displayed, wherein the display data comprise P rows and Q columns of pixel data arranged in an array; generating P rows of gate scan signals corresponding to the P rows of pixel data; in a case where P is less than M, generating M-P rows of supplementary gate scan signals based on the P rows of gate scan signals, wherein the P rows of gate scan signals and the M-P rows of supplementary gate scan signals form M rows of gate scan signals; and driving the M rows of pixel units using the M rows of gate scan signals, respectively, wherein P, Q, M and N are all positive integers.

For example, in the signal processing method provided by at least one embodiment of the present disclosure, in a case where M=A*P, generating M-P rows of supplementary gate scan signals based on the P rows of gate scan signals comprises: generating A-1 rows of supplementary gate scan signals between every two adjacent rows of gate scan signals in the P rows of gate scan signals; and generating A-1 rows of gate scan signals on at least one side of the P rows of gate scan signals, wherein A is an integer greater than 1.

For example, in the signal processing method provided by at least one embodiment of the present disclosure, the P rows of gate scan signals comprise an i-th row of gate scan signal and a (i+1)-th row of gate scan signal that are adjacent to each other; generating M-P rows of supplementary gate scan signals based on the P rows of gate scan signals comprises: generating, based on a timing of the i-th row of gate scan signal and the (i+1)-th row of gate scan signal, B rows of supplementary gate scan signals between the i-th row of gate scan signal and the (i+1)-th row of gate scan signal, wherein rising edges of the B rows of supplementary gate scan signals are all between a rising edge of the i-th row of gate scan signal and a rising edge of the (i+1)-th row of gate scan signal in timing, and falling edges of the B rows of supplementary gate scan signals are all between a falling edge of the i-th row of gate scan signal and a falling edge of the (i+1)-th row of gate scan signal in timing; and i is a positive integer less than P, and B is a positive integer less than or equal to M-P.

For example, in the signal processing method provided by at least one embodiment of the present disclosure, the rising edge of the i-th row of gate scan signal, the rising edges of the B rows of supplementary gate scan signals and the rising edge of the (i+1)-th row of gate scan signal are sequentially delayed in timing; and the falling edge of the i-th row of gate scan signal, the falling edges of the B rows of supplementary gate scan signals and the falling edge of the (i+1)-th row of gate scan signal are sequentially delayed in timing.

For example, in the signal processing method provided by at least one embodiment of the present disclosure, generating, based on the timing of the i-th row of gate scan signal and the (i+1)-th row of gate scan signal, B rows of supplementary gate scan signals between the i-th row of gate scan signal and the (i+1)-th row of gate scan signal, comprises: performing an interpolation operation on a phase of the i-th row of gate scan signal and a phase of the (i+1)-th row of gate scan signal to obtain phases of the B rows of supplementary gate scan signals.

For example, in the signal processing method provided by at least one embodiment of the present disclosure, a time difference between a rising edge and a falling edge of each row of supplementary gate scan signal in the B rows of supplementary gate scan signals is identical to a time difference between the rising edge and the falling edge of the i-th row of gate scan signal.

For example, in the signal processing method provided by at least one embodiment of the present disclosure, each of the pixel units comprises S sub-pixels, S sub-pixels comprised in a same pixel unit are arranged along a row direction, and the N columns of pixel units comprise N*S columns of sub-pixels; sub-pixels in a same column have a same polarity during a display time of a frame of an image to be displayed; and S is a positive integer.

For example, the signal processing method provided by at least one embodiment of the present disclosure, further comprises: driving the M rows of pixel units using the P rows of gate scan signals, respectively, in a case where P is equal to M.

For example, in the signal processing method provided by at least one embodiment of the present disclosure, the display apparatus further comprises N data signal lines respectively connected to the N columns of pixel units; the signal processing method further comprises: generating P rows of analog data signals based on the P rows of pixel data respectively, wherein the P rows of analog data signals comprise an i-th row of analog data signals, and the i-th row of analog data signals comprise Q analog data signals; and inputting the Q analog data signals of the i-th row of analog data signals respectively into Q data signal lines of the N data signal lines, during a time period starting from a time when data writing switches of a corresponding row of pixel units are driven on using the i-th row of gate scan signal to a time before data writing switches of a corresponding row of pixel units are driven on using the (i+1)-th row of gate scan signal.

For example, in the signal processing method provided by at least one embodiment of the present disclosure, each of the pixel units comprises S sub-pixels, the N columns of pixel units comprise N*S columns of sub-pixels, and the N data signal lines comprise N*S sub-data signal lines respectively connected to the N*S columns of sub-pixels; each of the analog data signals comprises S sub-analog data signals, and the Q analog data signals comprise Q*S sub-analog data signals; and inputting the Q analog data signals of the i-th row of analog data signals respectively into Q data signal lines of the N data signal lines, comprises: inputting the Q*S sub-analog data signals respectively into Q*S sub-data signal lines among the N*S sub-data signal lines.

For example, the signal processing method provided by at least one embodiment of the present disclosure, further comprises: performing a data supplement operation in a case where Q is less than N, wherein the data supplement operation comprises: generating N-Q columns of supplementary pixel data based on the Q columns of pixel data, wherein the Q columns of pixel data and the N-Q columns of supplementary pixel data form N columns of pixel data; generating N columns of analog data signals based on the N columns of pixel data; and inputting the N columns of analog data signals respectively into the N columns of pixel units.

For example, in the signal processing method provided by at least one embodiment of the present disclosure, in a case where N=C*Q, generating N-Q columns of supplementary pixel data based on the Q columns of pixel data comprises: generating C-1 columns of supplementary pixel data between every two adjacent columns of pixel data in the Q columns of pixel data; and generating C-1 columns of supplementary pixel data on at least one side of the Q columns of pixel data, wherein C is an integer greater than 1.

For example, in the signal processing method provided by at least one embodiment of the present disclosure, the Q columns of pixel data comprise a j-th column of pixel data and a (j+1)-th column of pixel data that are adjacent to each other; and generating N-Q columns of supplementary pixel data based on the Q columns of pixel data comprises: performing an interpolation operation on the j-th column of pixel data and the (j+1)-th column of pixel data to generate D columns of supplementary pixel data between the j-th column of pixel data and the (j+1)-th column of pixel data, wherein j is a positive integer less than Q, and D is a positive integer less than or equal to N-Q.

For example, the signal processing method provided by at least one embodiment of the present disclosure, further comprises: in a case where Q is equal to N, generating Q columns of analog data signals respectively based on the Q columns of pixel data, wherein the Q columns of analog data signals are configured to be respectively input into the N columns of pixel units.

For example, in the signal processing method provided by at least one embodiment of the present disclosure, further comprises: determining whether display data of a plurality of consecutive frames of images to be displayed conforms to an alternating display rule, wherein Q columns of pixel data of the display data conforming to the alternating display rule cycle between g pixel values, and the g pixel values correspond to g luminance features, respectively; and if yes, dividing the plurality of frames of images to be displayed into a plurality of image groups, wherein each image group comprises adjacent g frames of images to be displayed, and following operations are performed for each image group: if a current frame of an image to be displayed is a k-th frame of an image to be displayed of the image group, transforming all Q columns of pixel data of the k-th frame of an image to be displayed to a k-th pixel value in the g pixel values; performing the data supplement operation for the Q columns of pixel data that are transformed; generating an analog data signal based on a (k+n*g)-th column of pixel data after the data supplement operation and inputting the analog data signal into a (k+n*g)-th column of pixel units to cause the (k+n*g)-th column of pixel units to be displayed as a k-th luminance feature in the g luminance features, wherein in a case where k is a positive integer greater than 1, remaining columns of pixel units other than the (k+n*g)-th column of pixel units are displayed as luminance features corresponding to a previous frame of an image to be displayed of the k-th frame of the image to be displayed; and in a case where k is equal to 1, the remaining columns of pixel units other than the (k+n*g)-th column of pixel units are not displayed, wherein n takes all integers from 0 to [Q/g−1], g is an integer greater than 1 and less than Q, and k is an integer less than or equal to g.

At least one embodiment of the present disclosure also provides a display apparatus, which comprises: a display substrate, comprising M rows and N columns of pixel units arranged in an array; and a timing controller, comprising a data receiving module and a gate signal generation module, wherein the data receiving module is configured to acquire display data of a frame of an image to be displayed, and the display data comprise P rows and Q columns of pixel data arranged in an array; the gate signal generation module is configured to: generate P rows of gate scan signals corresponding to the P rows of pixel data; and perform a gate signal supplement operation in a case where P is less than M, wherein the gate signal supplement operation comprises generating M-P rows of supplementary gate scan signals based on the P rows of gate scan signals, and the P rows of gate scan signals and the M-P rows of supplementary gate scan signals form M rows of gate scan signals to drive the M rows of pixel units using the M rows of gate scan signals, respectively; and P, Q. M and N are all positive integers.

For example, the display apparatus provided by at least one embodiment of the present disclosure, further comprises: a source driver chip, connected to the M rows and N columns of pixel units through a plurality of data signal lines extending along a second direction intersecting with a first direction to provide analog data signals to the M rows and N columns of pixel units, wherein the source driver chip is configured to perform a data supplement operation in a case where Q is less than N, and the data supplement operation comprises: generating N-Q columns of supplementary pixel data based on the Q columns of pixel data, wherein the Q columns of pixel data and the N-Q columns of supplementary pixel data form N columns of pixel data; generating N columns of analog data signals based on the N columns of pixel data; and inputting the N columns of analog data signals respectively into the N columns of pixel units.

For example, in the display apparatus provided by at least one embodiment of the present disclosure, the source driver chip further comprises: a buffer module, configured to buffer the display data; a plurality of operation modules, configured to perform the data supplement operation to obtain the N-Q columns of supplementary pixel data; and a plurality of digital-to-analog conversion modules, configured to convert the N columns of pixel data into the N columns of analog data signals.

For example, in the display apparatus provided by at least one embodiment of the present disclosure, the timing controller further comprises: a mode control module, configured to receive a mode instruction, and send a control signal to the gate signal generation module and/or the source driver chip based on the mode instruction to control whether the gate signal generation module performs the gate signal supplement operation and/or control whether the source driver chip performs the data supplement operation.

For example, in the display apparatus provided by at least one embodiment of the present disclosure, the source driver chip further comprises: a plurality of two-way switches, wherein each of the plurality of two-way switches comprises an input terminal and two output terminals, the input terminal is connected to the buffer module for receiving a column of pixel data, one of the two output terminals is connected to at least one of the plurality of digital-to-analog conversion modules, and the other of the two output terminals is connected to at least one of the plurality of operation modules; and a mode switching module, configured to control the two-way switch to output the column of pixel data to one of the two output terminals based on a control signal sent by the mode control module.

For example, in the display apparatus provided by at least one embodiment of the present disclosure, the timing controller further comprises an image recognition module, and the image recognition module is configured to: recognize whether display data of a plurality of consecutive frames of images to be displayed conforms to an alternating display rule, wherein Q columns of pixel data of the display data conforming to the alternating display rule cycle between g pixel values, and the g pixel values correspond to g luminance features, respectively; and if yes, divide the plurality of frames of images to be displayed into a plurality of image groups, wherein each image group comprises adjacent g frames of images to be displayed, and following operations are performed for each image group: if a current frame of an image to be displayed is a k-th frame of an image to be displayed of the image group, transform all Q columns of pixel data of the k-th frame of an image to be displayed to a k-th pixel value in the g pixel values; and output the Q columns of pixel data that are transformed to the source driver chip; wherein the source driver chip is further configured to: perform the data supplement operation for the Q columns of pixel data that are transformed; and generate an analog data signal based on a (k+n*g)-th column of pixel data after the data supplement operation and input the analog data signal into a (k+n*g)-th column of pixel units to cause the (k+n*g)-th column of pixel units to be displayed as a k-th luminance feature in the g luminance features, wherein in a case where k is a positive integer greater than 1, remaining columns of pixel units other than the (k+n*g)-th column of pixel units are displayed as luminance features corresponding to a previous frame of an image to be displayed of the k-th frame of the image to be displayed; and in a case where k is equal to 1, the remaining columns of pixel units other than the (k+n*g)-th column of pixel units are not displayed, wherein n takes all integers from 0 to [Q/g−1], g is an integer greater than 1 and less than Q. and k is an integer less than or equal to g.

At least one embodiment of the present disclosure provides an electronic device comprising the display apparatus provided by any embodiment of the present disclosure.

At least one embodiment of the present disclosure provides an electronic device, comprising: a processor; a memory, comprising one or more computer program modules, wherein the one or more computer program modules are stored in the memory and are configured to be executed by the processor, and the one or more computer program modules comprise instructions for implementing the signal processing method provided by any embodiment of the present disclosure.

At least one embodiment of the present disclosure provides a computer-readable storage medium, storing non-transitory computer-readable instructions, wherein the non-transitory computer-readable instructions are capable of being executed by a computer to implement the signal processing method provided by any embodiment of the present disclosure.

BRIEF DESCRIPTION OF DRAWINGS

In order to clearly illustrate the technical solutions of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Figure 1:
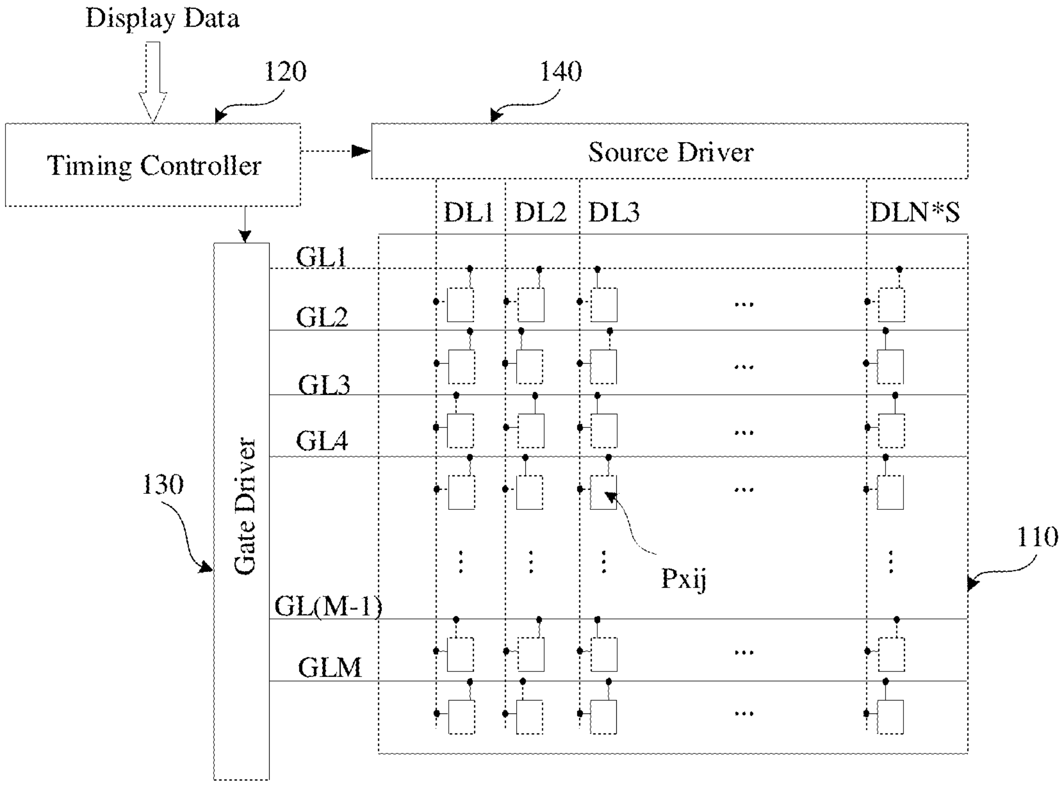
FIG. 1 is a schematic diagram of a display apparatus provided by at least one embodiment of the present disclosure.

FIG. 1 is a schematic diagram of a display apparatus provided by at least one embodiment of the present disclosure. As illustrated in FIG. 1, the display apparatus includes a display panel 110, a timing controller 120, a gate driver 130 and a source driver 140.

The display panel 110 includes a plurality of rows and columns of sub-pixels Pxij arranged in an array. For example, the display substrate 110 includes M rows and N columns of pixel units arranged in an array. The pixel unit is the smallest complete display unit of the display panel and may be composed of several sub-pixels Pxij. For example, each pixel unit includes S sub-pixels (S is a positive integer), and the S sub-pixels in the same pixel unit may be arranged along a row direction. In this case, N columns of pixel units include N*S columns of sub-pixels.

Figure 2:
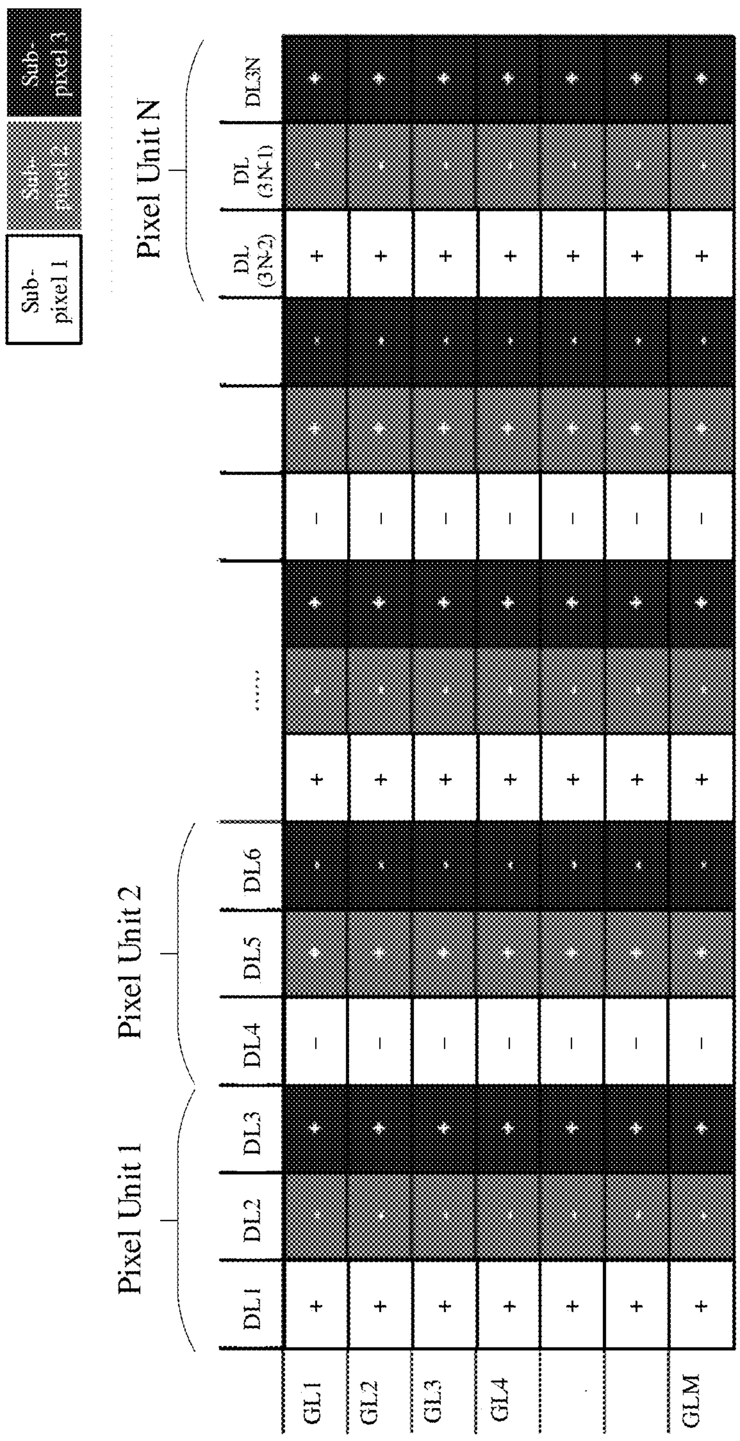
FIG. 2 is a schematic diagram of an arrangement of sub-pixels provided by at least one embodiment of the present disclosure.

FIG. 2 is a schematic diagram of an arrangement of sub-pixels provided by at least one embodiment of the present disclosure. As illustrated in FIG. 2, each pixel unit includes, for example, three sub-pixels arranged along the row direction, which are respectively sub-pixel 1, sub-pixel 2 and sub-pixel 3, and these three sub-pixels are, for example, R (red), G (green) and B (blue), the display panel includes M rows and 3N columns of sub-pixels. Three consecutive sub-pixels in each row form a pixel unit, for example, three sub-pixels connected to DL1~DL3 in the first row form pixel unit 1, three sub-pixels connected to DL4~DL6 in the first row form pixel unit 2, . . . , three sub-pixels connected to DL (3*x*-2)~DL3*x* in the first row form a pixel unit x, where 1<=x<=N, . . . , and three sub-pixels connected to DL(3N-2)~DL3N in the first row form a pixel unit N. In addition, the total number and arrangement of sub-pixels included in a pixel unit may also be in other ways, and the embodiments of the present disclosure are described by taking the case where a pixel unit includes 3 sub-pixels and the 3 sub-pixels in the same pixel unit are arranged along the row direction as an example.

As illustrated in FIG. 1 and FIG. 2, the display panel further includes a plurality of gate scan signal lines (GL1~GLM) extending along a first direction and a plurality of data signal lines (DL1~DLN*S) extending along a second direction intersecting with the first direction, for example, the first direction is the row direction, the second direction is the column direction, and the first direction is perpendicular to the second direction. The plurality of gate scan signal lines (GL1~GLM) are respectively connected to M rows of pixel units, one gate scan signal line may be connected to each sub-pixel in a row, and a gate scan signal transmitted by the gate scan signal line is used to drive switching devices of all sub-pixels in the corresponding row to be turned on. The plurality of data signal lines (DL1~DLN*S) are respectively connected to N*S columns of sub-pixels, and one data signal line is connected to each sub-pixel in a column. When a switching device of a sub-pixel is turned on, the data signal transmitted by the data signal line can be written into the sub-pixel, and the data signal is a signal for adjusting the gray scale displayed by the sub-pixel, so that each sub-pixel of the display panel displays different gray scales. In the following embodiments, GL1~GLM are used to represent both the gate scan signal lines and the gate scan signals transmitted on the corresponding gate scan signal lines, and DL1~DLN*S are used to represent both the data signal lines and the data signals transmitted on the corresponding data signal lines.

Each sub-pixel is connected to a gate scan signal line and a data signal line, and is controlled by the gate scan signal line and the data signal line to achieve gray scale change. In a process of presenting an image to be displayed, a row of sub-pixels in the display panel may be turned on each time, and a data driver 140 writes a data signal of a corresponding row into the row of sub-pixels that are turned on, so that the row of sub-pixels present a corresponding brightness. Turning on and writing row by row in this way can make the display panel present the image to be displayed according to the corresponding display brightness.

Figure 3:
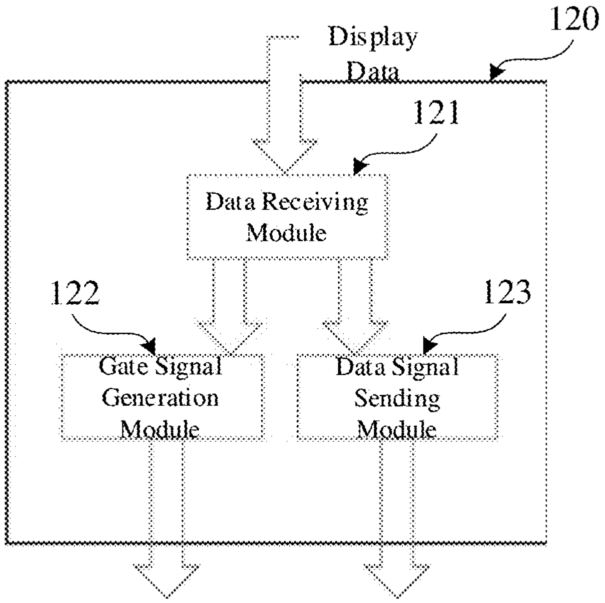
FIG. 3 is a schematic diagram of a timing controller provided by at least one embodiment of the present disclosure.

The timing controller 120 is a board for achieving a timing conversion function, which may be an independent component, or included in a processing system for signals such as front-end video. FIG. 3 is a schematic diagram of a timing controller provided by at least one embodiment of the present disclosure. As illustrated in FIG. 3, the timing controller 120 includes a data receiving module 121, a gate signal generation module 122 and a data signal sending module 123. The data receiving module 121 is used to receive the display data of the image to be displayed, and the gate signal generation module 122 generates one-to-one corresponding gate scan signals according to the vertical resolution of the display data (that is, the total number of rows of the display data), and sends the corresponding gate scan signals to the gate driver 130 to send the gate scan signals to the display panel through a plurality of shift register units cascaded in the gate driver 130. The data signal sending module 123 sends the display data to the source driver, and there is a one-to-one correspondence between received and sent pixel data, which is called Point to Point (P to P), that is, the total number of columns of received data is the same as the total number of columns of sent data, and the total number of rows of received data is the same as the total number of rows of sent data. The source driver processes the data signal and sends the data signal to the display panel. In some of the following embodiments, the timing controller is also referred to as a timing control board. In some of the following embodiments, the gate signal generation module is also referred to as a gate line signal generation module, and the gate scan signal is also called a gate line signal.

The source driver 140 may include a source driver IC (Integrated Circuit Chip), which is responsible for converting a received digital data signal into an analog data signal capable of driving pixels for display, and output channels of the source driver IC correspond to the columns of the display panel one by one. The digital data signal refers to the data signal that the timing control board evenly divides each row of the pixel data signal and sends the pixel data signal to the source driver IC through the data signal sending module, and the digital data signal is a binary digital signal; the analog data signal is converted from the digital data signal combined with analog voltage by the source driver IC and sent to each data line of the display panel, and the analog data signal is an analog voltage signal. In some of the following embodiments, the source driver 140 is also simply referred to as a source driver IC or a source driver chip.

Figure 4:
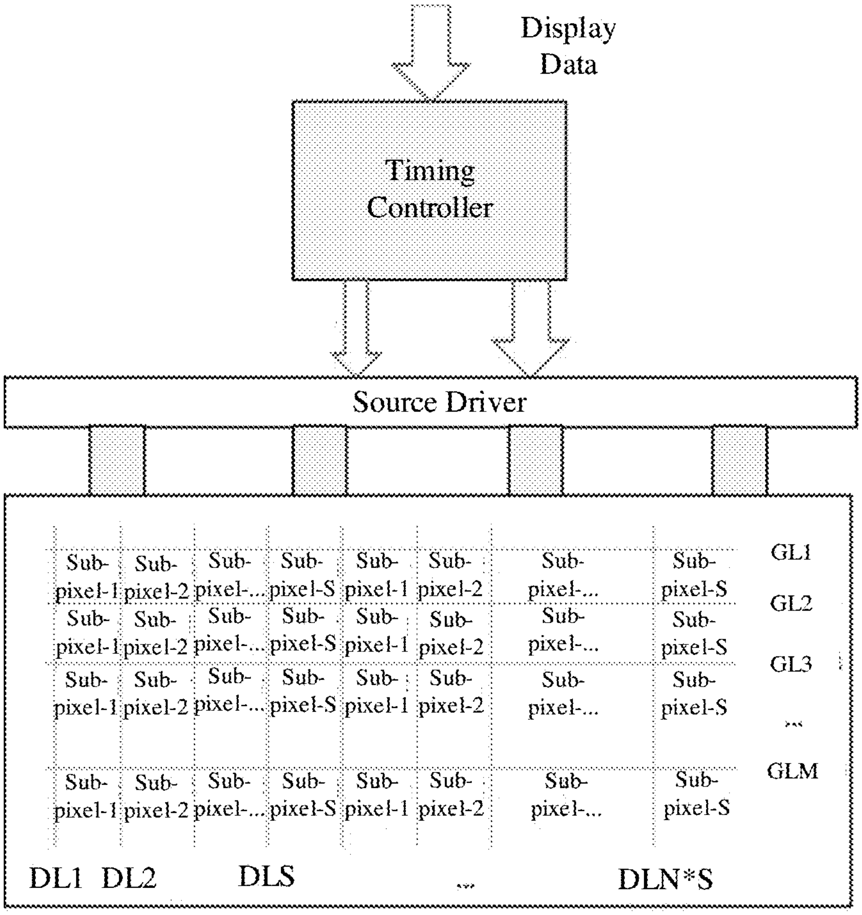
FIG. 4 is a schematic diagram of another display apparatus provided by at least one embodiment of the present disclosure.

FIG. 4 is a schematic diagram of another display apparatus provided by at least one embodiment of the present disclosure. As illustrated in FIG. 4, the gate driver can be integrated in the display panel, and the gate scan signals sent by the timing controller can be sent to the display panel through the source driver to drive the sub-pixels row by row through the integrated gate driver and gate scan signal lines of the display panel. The display data signal sent by the timing controller is sent to the source driver, and the display data signal is processed by the source driver and sent to respective columns of sub-pixels through the data signal lines.

In order to meet people's demand for high definition and high fluency, panels with ultra-high resolution and ultra-high refresh rate have been developed, resulting in a significant increase in the amount of data required for the display signal, such as 4K2K 240 Hz doubles the amount of data compared to 4K2K 120 Hz, and 8K4K 120 Hz quadruples the amount of data compared to 4K2K 120 Hz. The significant increase in the amount of data puts forward higher requirements on the processing speed of the system chip that generates the display signal, a higher rate of signal transmission requires the transmission path (design, process, materials, etc.) more optimized, while the display system's own timing control chip and source driver chip must also match the significant increase in the amount of data, which makes the cost rise sharply and seriously affects the popularity of the panels with ultra-high resolution and ultra-high refresh rate, and become a roadblock for people for a better life.

The display panel includes M rows and N columns of display units, then the physical resolution is N*M. Each row has N pixels, which is called horizontal resolution; and each column has M pixels, which is called vertical resolution. The resolution of the image to be displayed needs to match the physical resolution of the display panel, that is, the total number of rows and columns of the image to be displayed corresponds one-to-one to the total number of rows and columns of the display panel. In the case where the resolution of the display signal does not match the physical resolution of the display panel, for example, the horizontal resolution is only half of a panel resolution, which will result in the display panel not being able to display or displaying poorly.

At least one embodiment of the present disclosure provides a signal processing method, a display apparatus, an electronic device, and a computer-readable storage medium. The signal processing method is applicable to a display apparatus, the display apparatus includes a display substrate, and the display substrate includes M rows and N columns of pixel units arranged in an array. The signal processing method includes: acquiring display data of a frame of an image to be displayed, in which the display data includes P rows and Q columns of pixel data arranged in an array; generating P rows of gate scan signals corresponding to the P rows of pixel data; in a case where P is less than M, generating M-P rows of supplementary gate scan signals based on the P rows of gate scan signals, in which the P rows of gate scan signals and the M-P rows of supplementary gate scan signals form M rows of gate scan signals; and driving the M rows of pixel units using the M rows of gate scan signals, respectively, and P, Q, M and N are all positive integers.

The signal processing method of the embodiment of the present disclosure expands the total number of rows of the gate scan signals to be the same as the total number of rows of the pixel units of the display panel by generating a corresponding number of rows of gate scan signal based on the total number of rows of the display data and generating supplementary gate scan signals based on the gate scan signals. Based on this method, respective rows of pixel units of the display panel are capable of being displayed in the case where the vertical resolution of the image to be displayed is smaller than the vertical resolution of the display panel, thereby achieving the expansion of the vertical resolution and improving the display effect.

The embodiments of the present disclosure and some examples thereof will be described in detail below with reference to the drawings.

Figure 5:
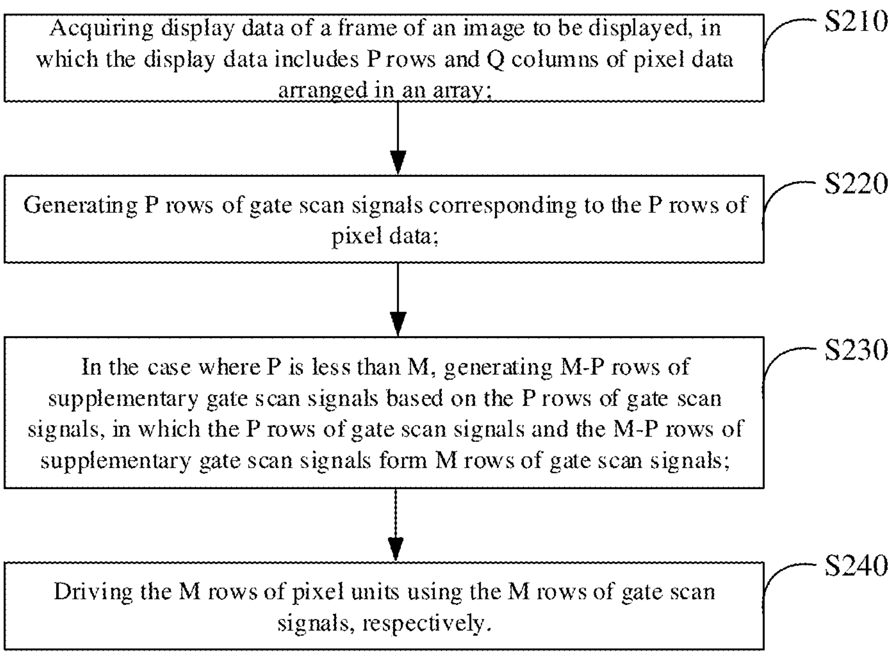
FIG. 5 is a schematic diagram of a signal processing method provided by at least one embodiment of the present disclosure.

FIG. 5 is a schematic diagram of a signal processing method provided by at least one embodiment of the present disclosure. The signal processing method is used, for example, for the above-mentioned display apparatus. As illustrated in FIG. 5, the signal processing method includes steps S210-S240.

Step S210: acquiring display data of a frame of an image to be displayed, in which the display data includes P rows and Q columns of pixel data arranged in an array.

Step S220: generating P rows of gate scan signals corresponding to the P rows of pixel data.

Step S230: in the case where P is less than M, generating M-P rows of supplementary gate scan signals based on the P rows of gate scan signals, in which the P rows of gate scan signals and the M-P rows of supplementary gate scan signals form M rows of gate scan signals.

Step S240: driving the M rows of pixel units using the M rows of gate scan signals, respectively.

For example, P, Q, M, and N are all positive integers, P is less than or equal to M, and Q is less than or equal to N.

For example, taking the display apparatus illustrated in FIG. 1 as an example, the display panel includes M rows and N columns of pixel units, each pixel unit includes S sub-pixels (S is a positive integer) arranged along the row direction, and the N columns of pixel units include N*S columns of sub-pixels, that is, the display panel includes M rows and N*S columns of sub-pixels. M rows of pixel units in the following content can also be understood as M rows of sub-pixels.

For example, the sub-pixels in the same column have the same polarity during a display time of a frame of an image to be displayed, both positive or negative. For example, the polarity of a sub-pixel here refers to the polarity of a data signal applied to the sub-pixel.

For example, in the step S220, the gate signal generation module generates a corresponding number of rows of gate scan signals corresponding to the total number of rows P of the image to be displayed.

For example, in the step S230, it may be determined whether the total number of rows P of the image to be displayed is less than the total number of rows M (that is, the total number of rows M of sub-pixels) of pixel units in the display panel, and if the total number of rows P of the image to be displayed is less than the total number of rows M of the pixel units, then M-P rows of supplementary gate scan signal are generated according to the P rows of gate scan signals that has already been generated, in order to complement the M rows of gate scan signals. For example, the physical resolution of the display panel is 1920×1200, that is, the total number of rows of pixel units included in the display panel is M=1200; and the image resolution of the image to be displayed is 1440×900, that is, the total number of rows of display data is P=900. In this case, 900 rows of gate scan signals are first generated according to the 900 rows of pixel data, and then 300 rows of supplementary gate scan signals are generated according to the 900 rows of gate scan signals to complement the 1200 rows of gate scan signals. For example, at least some rows in the M-P rows of supplementary gate scan signals may be interspersed between the P rows of gate scan signals, that is, at least one row of supplementary gate scan signals may be interspersed between certain two adjacent rows of the P rows of gate scan signals. Some rows in the M-P rows of supplementary gate scan signals may also be disposed on both sides of the P rows of gate scan signals. For example, in one way, the supplementary gate scan signals may be generated between only some rows in the P rows of gate scan signals; in another way, the supplementary gate scan signals may also be generated between every two adjacent rows in the P rows of gate scan signals; in yet another way, the supplementary gate scan signals may also be generated on one side or on both sides of the P rows of gate scan signals; or it may be any combination of the above-mentioned three ways.

The signal processing method of the embodiment of the present disclosure expands the total number of rows of the gate scan signals to be the same as the total number of rows of the pixel units of the display panel by generating a corresponding number of rows of gate scan signal based on the total number of rows of the display data and generating supplementary gate scan signals based on the gate scan signals. Based on this method, respective rows of pixel units of the display panel are capable of being displayed in the case where the vertical resolution of the image to be displayed is smaller than the vertical resolution of the display panel, thereby achieving the expansion of the vertical resolution and improving the display effect.

For example, the turn-on time period in the timing of each row of supplementary gate scan signals has an overlapping portion with the turn-on time period in the timing of at least one row of gate scan signals in the P rows of gate scan signals. For example, the turn-on time period of each row of supplementary gate scan signals has an overlapping portion with the turn-on time period of the nearest row of gate scan signals in the P rows of gate scan signals.

Figure 6:
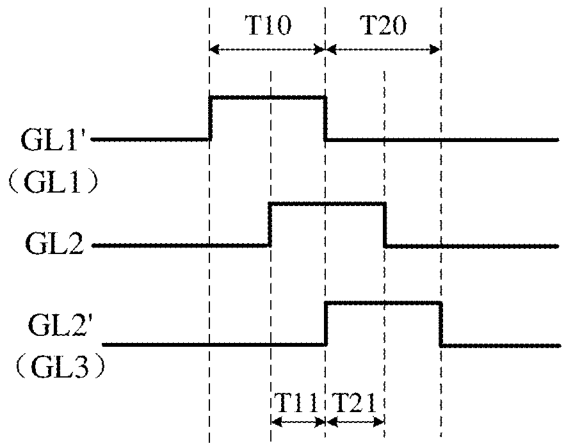
FIG. 6 is a schematic diagram of a timing of gate scan signals provided by at least one embodiment of the present disclosure.

FIG. 6 is a schematic diagram of a timing of gate scan signals provided by at least one embodiment of the present disclosure. As illustrated in FIG. 6, for example, the P rows of gate scan signals include two adjacent rows of gate scan signals GL1' and GL2', for example, the turn-on level of each of GL1' and GL2' is high level, the turn-on time periods of GL1' and GL2' are T10 and T20, respectively, and the gate scan signal can drive the switching devices of the corresponding row of pixel units to be in the turn-on state during the turn-on time period. For example, one row of supplementary gate scan signal GL2 (i.e., B=1) is generated between GL1' and GL2', and the turn-on time period of the supplementary gate scan signal GL2 has an overlapping portion with the turn-on time period of at least one of GL1 and GL3. For the convenience of description, the row numbers are adjusted (e.g., sequentially renumbered) after the gate scan signals are supplemented, and GL1' and GL2' can be used as the adjusted GL1 and GL3.

For example, in the process of displaying, because M rows of gate scan signals are generated, M rows of pixel units are turned on row by row. During the process of turning on the corresponding P rows of pixel units (that is, P rows of sub-pixels) driven by P rows of gate scan signals, the source driver transmits a data signal corresponding to the corresponding row to the display panel, so that the P rows of pixel units can display. During this process, because the turn-on time periods of M-P rows of supplementary gate scan signals have an overlapping portion with turn-on time periods of P rows of gate scan signals, during the time period in which the corresponding P rows of pixel units are driven to be turned on by the P rows of gate scan signals, the M-P rows of supplementary gate scan signals drive the remaining M-P rows of pixel units (that is, M-P rows of sub-pixels) to be turned on for a certain period of time, and thus the data signals are also written into the M-P rows of pixel units, causing that the M-P rows of pixel units to display. Therefore, after the M rows of pixel units are scanned row by row, all M rows of pixel units can be displayed.

For example, the P rows of gate scan signals include an i-th row of gate scan signal and a (i+1)-th row of gate scan signal that are adjacent to each other. Taking the i-th row of gate scan signal and the (i+1)-th row of gate scan signal as an example, the step S230 includes: generating, based on a timing of the i-th row of gate scan signal and the (i+1)-th row of gate scan signal, B rows of supplementary gate scan signals between the i-th row of gate scan signal and the (i+1)-th row of gate scan signal; rising edges of the B rows of supplementary gate scan signals are all between a rising edge of the i-th row of gate scan signal and a rising edge of the (i+1)-th row of gate scan signal in timing, and falling edges of the B rows of supplementary gate scan signals are all between a falling edge of the i-th row of gate scan signal and a falling edge of the (i+1)-th row of gate scan signal in timing; i is a positive integer less than P. and B is a positive integer less than or equal to M-P.

It should be noted that the i-th row and the (i+1)-th row refer to signal rows, that is, gate scan signal rows, which are different from physical pixel rows of the display panel. The i-th row of gate scan signal may also be referred to as an i-th gate scan signal row, and the (i+1)-th row of gate scan signal may also be referred to as a (i+1)-th gate scan signal row. Similarly, the "rows" in P rows, M rows, and B rows are all gate scan signal rows, the P rows of gate scan signals may also be referred to as P gate scan signal rows, the M rows of gate scan signals may also be referred to as M gate scan signal rows, and B rows of supplementary gate scan signals may also be referred to as B supplementary gate scan signal rows.

For example, in some embodiments, B is less than or equal to 4, that is, the total number of supplementary gate scan signal rows generated between any two adjacent gate scan signal rows in P rows of gate scan signals is less than or equal to 4. Based on this method, for a display panel with a resolution of 4K or 8K, a good visual effect can be achieved in the process of displaying images based on the supplemented gate scan signals, which do not produce obvious picture abnormalities for human eyes.

For example, as illustrated in FIG. 6, the i-th row of gate scan signal is, for example, GL1, and the (i+1)-th row of gate scan signal is, for example, GL3, and in terms of timing, a rising edge of a supplementary gate scan signal GL2 generated between GL1 and GL3 is between a rising edge of GL1 and a rising edge of GL3, and a falling edge of GL2 is between a falling edge of GL1 and a falling edge of GL3, that is, the turn-on time period of GL2 is between the turn-on time periods of GL1 and GL3 on either side thereof. During a second half of the time period T11 in which the first row of pixel units corresponding to GL1 are in the turn-on state, the second row of pixel units corresponding to GL2 are also in the turn-on state, and therefore, the display data corresponding to the first row of pixel units is also written into the second row of pixel units to be displayed as luminance features corresponding to the first row of pixel units during the time period T11. Moreover, during a first half of the time period T21 in which the third row of pixel units corresponding to GL3 are in the turn-on state, the second row of pixel units corresponding to GL2 are also in the turn-on state, and therefore, the display data corresponding to the third row of pixel units is also written into the second row of pixel units to be displayed as luminance features corresponding to the third row of pixel units during the time period T21. Therefore, the second row of pixel units corresponding to GL2 mixes the luminance features of the first row of pixel units and the third row of pixel units, and the second row of pixel units can be referred to as the color transition between the first row of pixel units and the third row of pixel units.

For example, the rising edge of the i-th row of gate scan signal, the rising edges of the B rows of supplementary gate scan signals and the rising edge of the (i+1)-th row of gate scan signal are sequentially delayed in timing. The falling edge of the i-th row of gate scan signal, the falling edges of the B rows of supplementary gate scan signals and the falling edge of the (i+1)-th row of gate scan signal are sequentially delayed in timing. For example, the rising edge of GL1, the rising edge of GL2 and the rising edge of GL3 are sequentially delayed in timing; and the falling edge of GL1, the falling edge of GL2 and the falling edge of GL3 are sequentially delayed in timing. Based on this method, the transition can be made more natural, ensuring an even transition of pixel colors.

For example, in some embodiments, an interpolation operation may be performed on a phase of the i-th row of gate scan signal and a phase of the (i+1)-th row of gate scan signal to obtain phases of the B rows of supplementary gate scan signals. For example, an interpolation operation is performed on a phase of GL1 and a phase of GL3 to obtain a phase of GL2, so that the turn-on time period of GL2 is in the middle of the turn-on time periods of GL1 and GL3, the time period T11 is half of T10, and the time period T21 is half of T20, which makes the transition of the first row of pixel units, the second row of pixel units, and the third row of pixel units more natural. For example, the above only takes the case where one row of supplementary gate scan signal is generated between the i-th row of gate scan signal and the (i+1)-th row of gate scan signal as an example for illustration, but the present disclosure is not limited thereto, and in the case where a plurality of rows of supplementary gate scan signals are generated between the i-th row of gate scan signal and the (i+1)-th row of gate scan signal, the phases of the supplementary gate scan signals can also be obtained by means of the interpolation operation.

For example, the time difference between a rising edge and a falling edge of each row of supplementary gate scan signal in the B rows of supplementary gate scan signals is identical to the time difference between the rising edge and the falling edge of the i-th row of gate scan signal. For example, the time difference T10 between the rising edge and the falling edge of GL1, the time difference T11+T21 between the rising edge and the falling edge of GL2, and the time difference T20 between the rising edge and the falling edge of GL3 are all the same.

Figure 7:
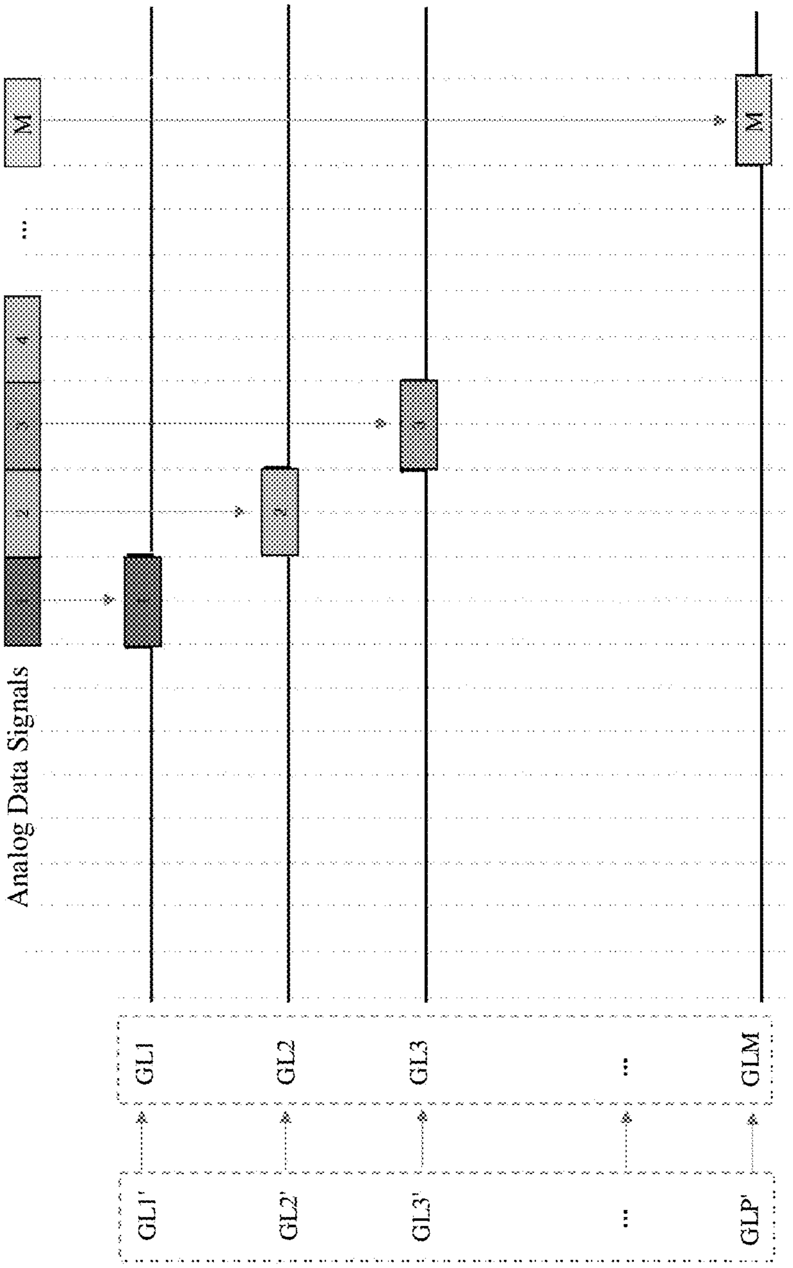
FIG. 7 is a schematic diagram of a display process provided by at least one embodiment of the present disclosure.
Figure 8:
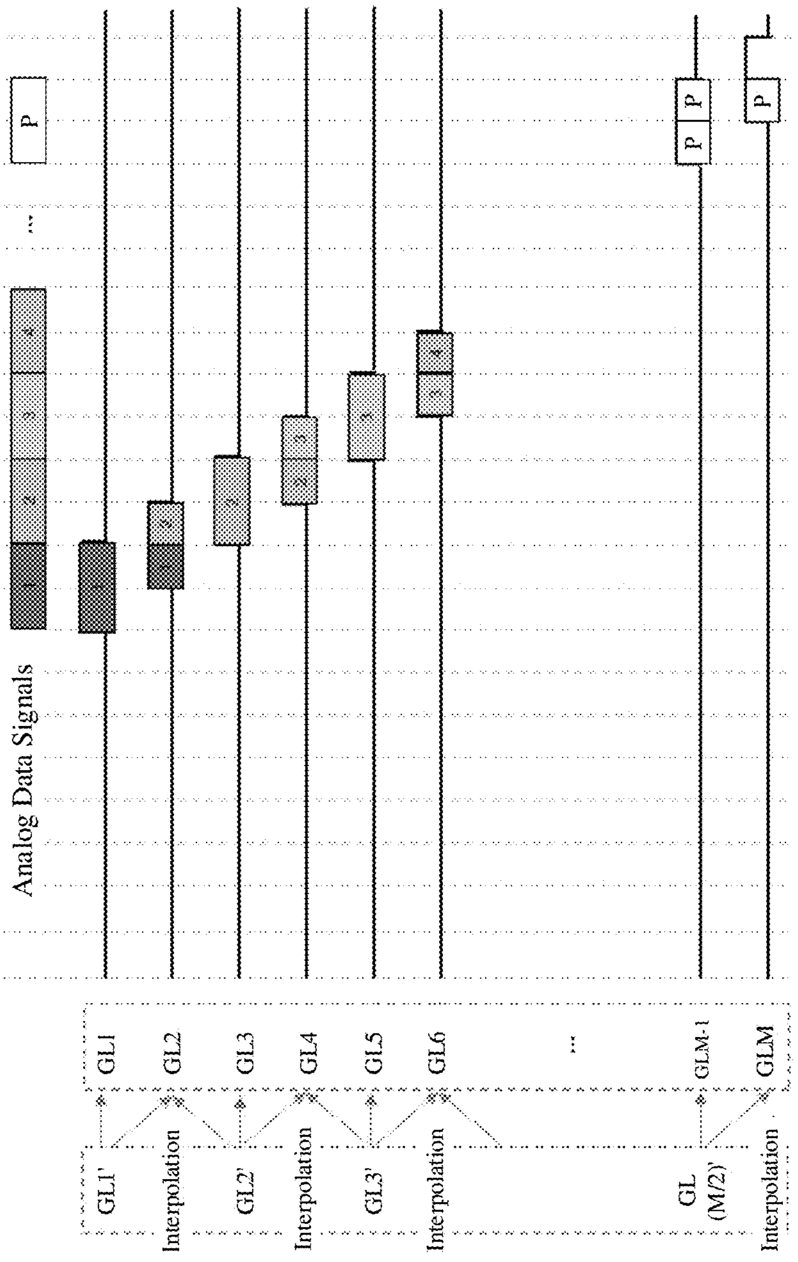
FIG. 8 is a schematic diagram of another display process provided by at least one embodiment of the present disclosure.

FIG. 7 is a schematic diagram of a display process provided by at least one embodiment of the present disclosure. FIG. 8 is a schematic diagram of another display process provided by at least one embodiment of the present disclosure. FIG. 7 illustrates the case where the vertical resolution M of the display panel is the same as the vertical resolution P of the display data of the image to be displayed, and FIG. 8 illustrates that the vertical resolution M of the display panel is twice the vertical resolution P of the display data of the image to be displayed. The embodiments of the present disclosure will be further described in detail below with reference to FIG. 7 and FIG. 8.

As illustrated in FIG. 7, in the case where M=P, the M rows of pixel units are driven using the P rows of gate scan signals, respectively. For example, GL1'~GLP' are P rows of gate scan signals generated according to P rows of display data, and GL1~GLM are gate scan signals output to the display panel by the timing controller, because M=P, the plurality of rows of gate scan signals generated based on the display data can be output in one-to-one correspondence. The analog data signals 1~M are respectively used to be written into each row of pixel units, representing the luminance features (such as gray scales) displayed by each row of data units. For example, the first row of pixel units corresponds to analog data signal 1, and during the time period when the first row of gate scan signal GL1 turns on the first row of pixel units, the analog data signal 1 is written into the first row of pixel units, so that the first row of pixel units has luminance feature 1. Similarly, during the process of GL2~GLM turning on the second row of pixel units to the M-th row of pixel units row by row, the analog data signals 2~M are written into the second row of pixel units to the M-th row of pixel units row by row, so that the second row of pixel units to the M-th row of pixel units have luminance feature 2~luminance feature M, respectively.

For example, in the case where M=A*P, the step S230 includes: generating A-1 rows of supplementary gate scan signals between every two adjacent rows of gate scan signals in the P rows of gate scan signals; and generating A-1 rows of gate scan signals on at least one side of the P rows of gate scan signals, in which A is an integer greater than 1. For example, if the total number of rows M of the pixel unit is twice the total number of rows P of the display data, one row of supplementary gate scan signal is generated between every two adjacent rows in the P rows of gate scan signals, and one row of supplementary gate scan signal is generated on one side of the P rows of gate scan signals, for example, one supplementary gate scan signal row is generated on an upper side or a lower side. For example, the supplementary gate scan signal is generated by means of interpolation operation as described above.

As illustrated in FIG. 8, P=M/2, GL1'~GL(M/2)' are M/2 rows of gate scan signals generated according to M/2 rows of display data, respectively, GL1~GLM are gate scan signals output to the display panel by the timing controller, and GL1~GLM includes GL1'~GL(M/2)' and supplementary gate scan signals generated according to GL1'~GL(M/2)'. For example, GL1'~GL(M/2)' may be used as the odd-numbered rows GL1, GL3, GL5, . . . . GL(M-1), respectively, in the output signals, then intermediate even-numbered rows of supplementary gate scan signals GL2, GL4, GL6, . . . . GL(M-2) are generated between every two adjacent odd-numbered rows, and one row of supplementary gate scan signal GLM is generated in the last even-numbered row.

For example, if the total number of rows M of the pixel units is three times the total number of rows P of the display data, then two supplementary gate scan signal rows are generated between every two adjacent rows in the P rows of gate scan signals, and two supplementary gate scan signal rows are generated on one side (an upper side or a lower side) of the P rows of gate scan signals, or one supplementary gate scan signal row is generated on both sides of the P rows of gate scan signals, respectively.

For example, the display apparatus further includes N data signal lines respectively connected to N columns of pixel units. As illustrated in FIG. 8. P rows of analog data signals are generated based on P rows of pixel data respectively. The analog data signals 1~P are used for writing 1~M rows of pixel units. For the convenience of description, the analog data signals 1~P are arranged in a row direction in the figure, but it does not mean that the analog data signals 1~P are located in the same row, and the analog data signals 1~P correspond to pixel units in different rows.

For example, the P rows of analog data signals include an i-th row of analog data signals (for example, the first row of analog data signals), and the i-th row of analog data signals include Q analog data signals (each row of analog data signals may include a plurality of signals to correspond to a plurality of columns, respectively). In the example illustrated in FIG. 8, the plurality of analog data signals included in the first row of analog signals are all analog data signal 1. During a time period starting from a time when data writing switches of a corresponding row of pixel units are driven on using the i-th row of gate scan signal to a time before data writing switches of a corresponding row of pixel units are driven on using the (i+1)-th row of gate scan signal, Q analog data signals of the i-th row of analog data signals are input into Q data signal lines of the N data signal lines, respectively. For example, Q signals in the first row of analog data signals are respectively input into Q pixel units in the first row, and Q is a positive integer less than or equal to N.

For example, each analog data signal includes S sub-analog data signals, the Q analog data signals include Q*S sub-analog data signals, and the Q*S sub-analog data signals are respectively input into Q*S sub-data signal lines among N*S sub-data signal lines. For example, Q pixel units in the first row include Q*S sub-pixels, and Q signals in the first row of analog data signals also include Q*S sub-signals. Therefore, the Q*S sub-signals in the first row of analog data signals are respectively written into the Q*S sub-pixels in the first row.

For example, as illustrated in FIG. 8, during the time period when the first row of gate scan signal GL1 turns on the first row of pixel units, the analog data signal 1 is written into the first row of pixel units, so that the first row of pixel units have the luminance feature 1. Moreover, during the second half of the time period when the first row of pixel units are turned on, the second row of pixel units are also in a turn-on state, therefore, the analog data signal 1 can also be written into the second row of pixel units. During the time period when the third row of gate scan signal GL3 turns on the third row of pixel units, the analog data signal 2 is written into the third row of pixel units, so that the third row of pixel units have the luminance feature 1. Moreover, during the first half of the time period when the third row of pixel units are turned on, the second row of pixel units are also in a turn-on state, therefore, the analog data signal 2 can also be written into the second row of pixel units. Thus, the second row of pixel units can be displayed as the alternation of luminance feature 1 and luminance feature 2, presenting a uniform transition.

Figure 9:
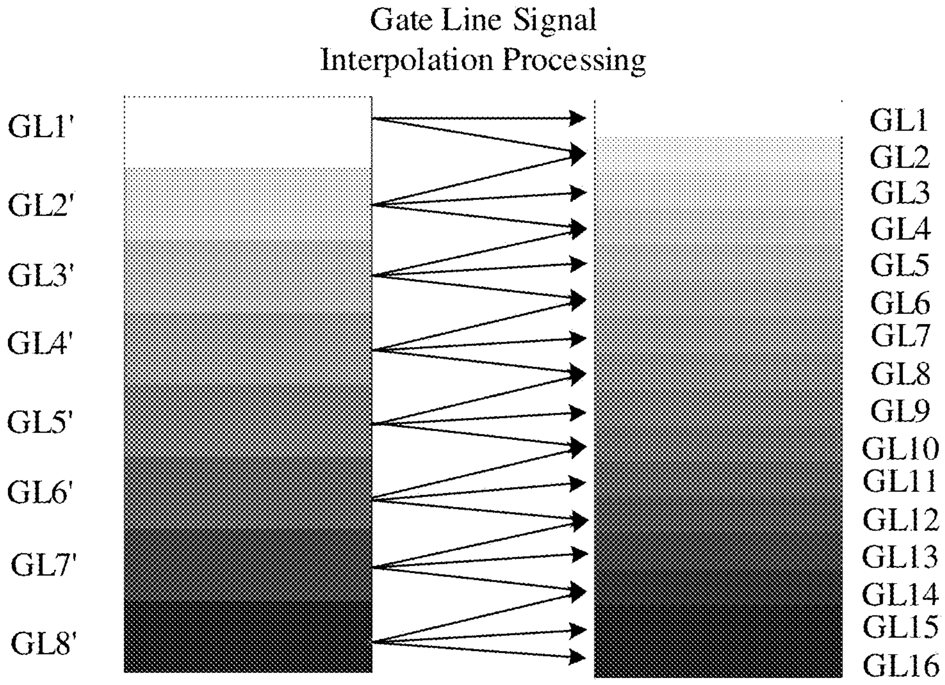
FIG. 9 is a schematic diagram of a gray scale change provided by at least one embodiment of the present disclosure.

The analog data signals corresponding to odd-numbered rows of gate lines of the display panel are the data of each row output by the source driver IC in turn, and the analog data signals corresponding to even-numbered rows (except for the M-th row) of gate lines are the superposition of the upper and lower rows of data that last for a certain period of time. That is, the actual charging process of the present row of pixel units is to first charge a previous row of pixel data for a period of time, and then charge a next row of pixel data for a period of time, so the display illustrates the transition of the upper and lower rows of pixel data, and the display effect is illustrated in FIG. 9. And the actual charging time of each row of pixel units is two rows of charging time, thereby increasing the charging rate and reducing the poor image quality caused by insufficient charging. The analog data signal corresponding to the M-th row is the (M-1)-th row of analog data signal for a period of time, which is displayed as being close to the (M-1)-th row. The expansion of the vertical resolution is achieved by doubling the interpolation of the gate line signal.

FIG. 9 is a schematic diagram of a gray scale change provided by at least one embodiment of the present disclosure. As illustrated in FIG. 9, the example of using the P rows of gate scan signals (e.g., GL1'~GL8') as odd-numbered rows of gate scan signals (e.g., GL1, GL3, . . . , GL15) and generating even-numbered rows of supplementary gate scan signals (e.g., GL2, GL4, . . . , GL16) as described above is followed. A column of gray scales on the left, for example, represent the luminance features of 8 rows of pixel units respectively corresponding to GL1'~GL8' before the expansion of the gate scan signals, and a column of gray scales on the right, for example, represent the luminance features of 16 rows of pixel units respectively corresponding to GL1~GL16 after the expansion of the gate scan signals. The phase of an even-numbered row of gate line scan signal is an interpolation of the phases of two adjacent odd-numbered rows (an upper row and a lower row) of gate line scan signals, so that the gray scale of the even-numbered row of pixel units is the transition of the gray scales of the adjacent odd-numbered rows of pixel units, which will not cause color confusion. For example, the phase of GL2 is the interpolation of the phase of GL1' (that is, GL1) and the phase of GL2' (that is, GL3), and the gray scale of one row of pixel units corresponding to GL2 is the interpolation of the gray scales of the upper and lower rows of pixel units, which can form a natural and uniform transition. The same is true for other rows, so that the entire display picture after expansion presents a better display effect.

Figure 10:
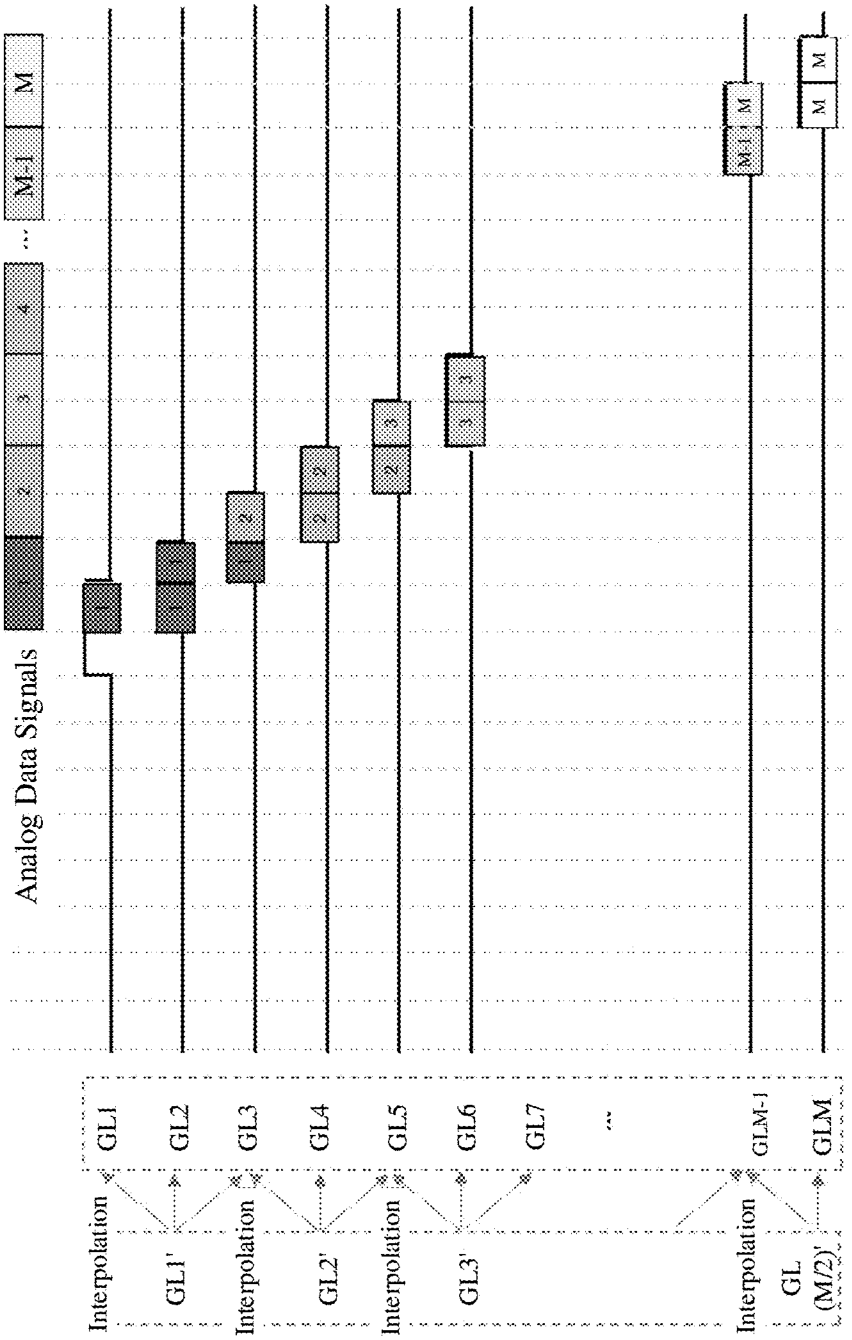
FIG. 10 is a schematic diagram of yet another display process provided by at least one embodiment of the present disclosure.

FIG. 10 is a schematic diagram of yet another display process provided by at least one embodiment of the present disclosure. As illustrated in FIG. 10, P=M/2, GL1'~GL(M/2)' are used as the even-numbered rows GL2, GL4, GL6, . . . , GLM in the output signals, respectively, one row of supplementary gate scan signal GL1 is generated in the first odd-numbered row, and the intermediate odd-numbered rows of supplementary gate scan signals GL3, GL5, . . . , GL(M-1) are generated between every two adjacent even-numbered rows.

For example, above FIG. 8 and FIG. 10 are all described with A-1 being equal to 1 as an example, in other embodiments, if A-1 is greater than 1, A-1 is for example 2, except that two rows of supplementary gate scan signals are generated between every two adjacent rows, A-1 rows of supplementary gate scan signals may also be generated on both sides of the P rows of gate scan signals, for example, one row of supplementary gate scan signal is generated on both sides.

For example, the above describes the processing method in which the vertical resolution of the image to be displayed is smaller than the vertical resolution of the display panel, and the following describes the processing method in which the horizontal resolution of the image to be displayed is smaller than the horizontal resolution of the display panel.

For example, in the case where the column number Q of the display data is less than the column number N of the pixel units, a data supplement operation is performed, and the data supplement operation includes: generating N-Q columns of supplementary pixel data based on the Q columns of pixel data, in which the Q columns of pixel data and the N-Q columns of supplementary pixel data form N columns of pixel data; generating N columns of analog data signals based on the formed N columns of pixel data; and inputting the N columns of analog data signals respectively into the N columns of pixel units. Based on this method, the data signal can be supplemented, so that a data signal is written into each column of pixel units, and the horizontal resolution is improved. In some of the following embodiments, the pixel signal, data signal and pixel data signal all represent a signal of pixel data.

For example, each pixel unit includes S sub-pixel units arranged in the row direction, each pixel data may also be understood as a collection of S sub-pixel data, and the process of writing one pixel data into one pixel unit may be understood to the process of writing S sub-pixel data into S sub-pixels. In the process of generating the supplementary pixel data, an interpolation operation may also be performed on S sub-pixel data included in two adjacent columns of pixel data to obtain S sub-pixel data of the supplementary pixel data.

For example, at least some columns in the N-Q columns of supplementary pixel data may be interspersed between the Q columns of pixel data, that is, at least one column of supplementary pixel data may be interspersed between certain two adjacent columns of the Q columns of pixel data. Some columns in the N-Q columns of supplementary pixel data may also be disposed on both sides of the Q columns of pixel data. For example, in one way, the supplementary pixel data may be generated between only some columns in the Q columns of pixel data; in another way, the supplementary pixel data may also be generated between every two adjacent columns in the Q columns of pixel data; in yet another way, the supplementary pixel data may also be generated on one side or on both sides of the Q columns of pixel data; or it may be any combination of the above-mentioned three ways.

Figure 11:
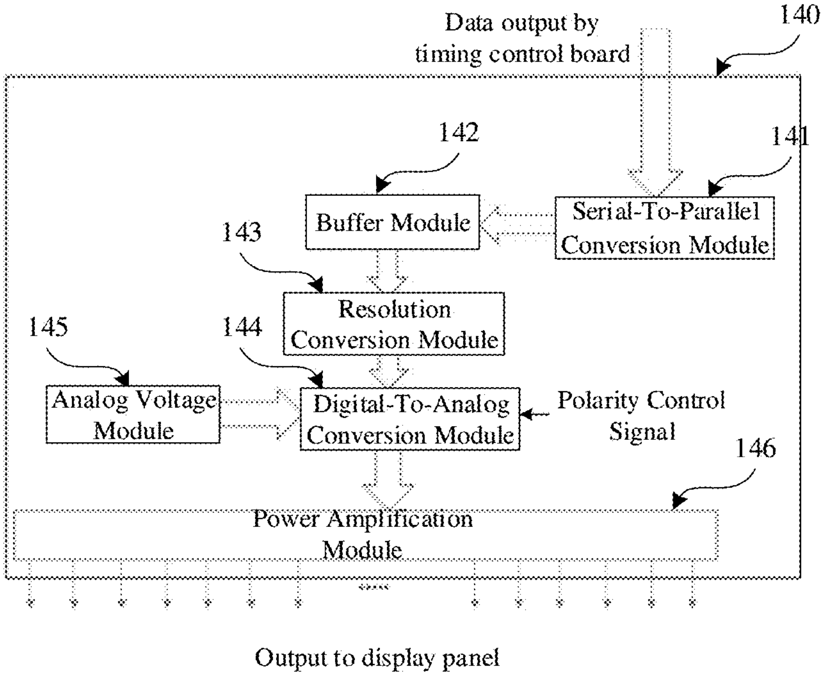
FIG. 11 is a schematic diagram of a source driver provided by at least one embodiment of the present disclosure.

The data supplement operation is performed, for example, by a source driver. FIG. 11 is a schematic diagram of a source driver provided by at least one embodiment of the present disclosure. As illustrated in FIG. 11, the source driver includes a serial-to-parallel conversion module 141, a buffer module 142, a resolution conversion module 143, a digital-to-analog conversion module 144, an analog voltage module 145 and a power amplification module 146. For example, the serial-to-parallel conversion module 141 is responsible for converting a serial digital data signal sent by the timing control board into a parallel digital data signal and sending the parallel digital data signal to the buffer module 142. The buffer module 142 is responsible for storing the parallel digital data signal sent by the serial-to-parallel conversion module and outputting the parallel digital data signal to the resolution conversion module 143, and each sub-pixel data corresponds to one output channel. The resolution conversion module 143 is between the buffer module 142 and the digital-to-analog conversion module 144, the function of the resolution conversion module 143 is to adjust the ratio of the input and output signal quantities, for example, to generate supplementary sub-pixel data according to existing sub-pixel data, the conversion action is completed before the signal enters the digital-to-analog conversion module 144, and the resolution conversion module 143 includes, for example, a plurality of operation modules (operators) and related connection wires. The resolution conversion module 143 sends the supplemented pixel data to the digital-to-analog conversion module 144. The signal sent by the resolution conversion module 143 to the digital-to-analog conversion module 144 is a digital data signal, and the digital-to-analog conversion module 144 is responsible for converting the digital data signal in combination with the analog voltage sent by the analog voltage module into an analog data signal, and outputting the analog data signal to the power amplification module 146. The source driver may include a plurality of digital-to-analog conversion modules, each sub-pixel data corresponds to one digital-to-analog conversion module, and the input and output channels of the digital-to-analog conversion module correspond one-to-one with the output channel of the buffer module and the input channel of the power amplification module, respectively.

For example, the power amplification module 146 is responsible for amplifying the output capability of each channel, and output channels of the power amplification module 146 are connected to data signal lines of the display panel one by one. The polarity of the analog data signal output by the digital-to-analog conversion module 144 is controlled by a polarity control signal (i.e., the polarity control signal illustrated in the figure), for example, for a certain frame of an image to be displayed, the polarity control signal is provided to make output voltages of odd-numbered channels of the digital-to-analog conversion module positively polarized and output voltages of even-numbered channels negatively polarized, so that odd-numbered columns of sub-pixels of the display panel are driven by positively polarized voltages, and even-numbered columns are driven by negatively polarized voltages; and the positive and negative polarization switching of the odd-numbered columns and even-numbered columns is carried out in the next frame.

For example, the Q columns of pixel data include a j-th column of pixel data and a (j+1)-th column of pixel data that are adjacent to each other. The interpolation operation can be performed on the j-th column of pixel data and the (j+1)-th column of pixel data to generate D columns of supplementary pixel data between the j-th column of pixel data and the (j+1)-th column of pixel data, j is a positive integer less than Q, and D is a positive integer less than or equal to N-Q.

Figure 12:
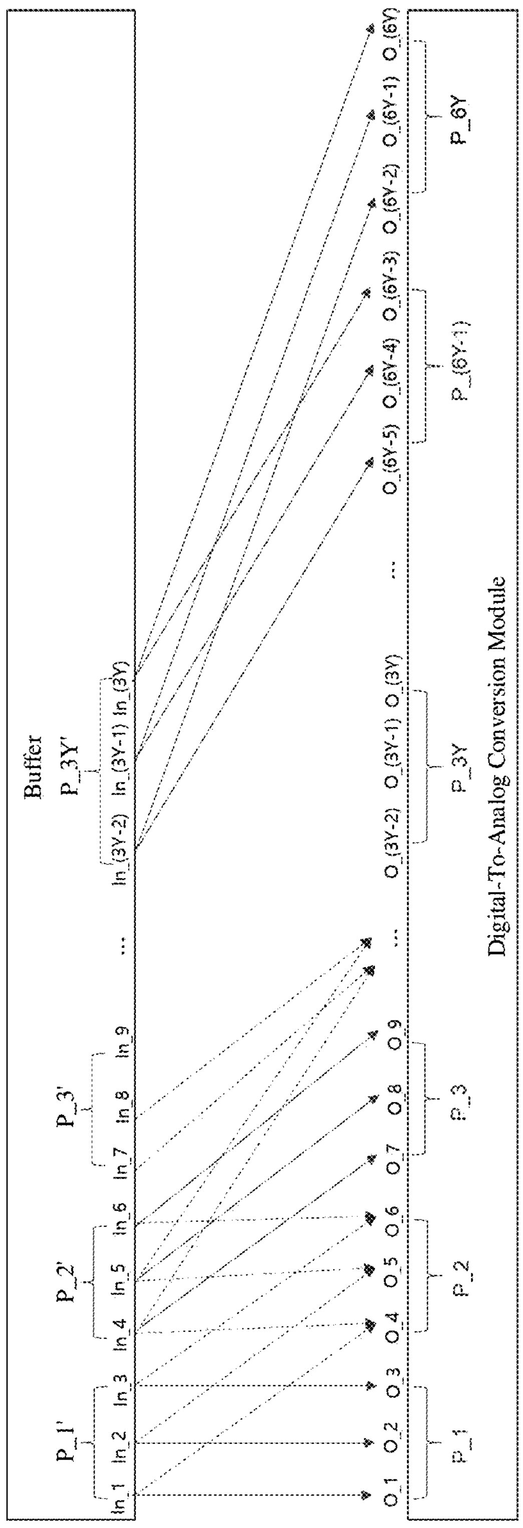
FIG. 12 is a schematic diagram of input pixel data and output pixel data in a source driver provided by at least one embodiment of the present disclosure.

FIG. 12 is a schematic diagram of an input signal and an output signal of a resolution conversion module provided by at least one embodiment of the present disclosure. As illustrated in FIG. 12, for example, the j-th column of pixel data and the (j+1)-th column of pixel data are the first column of pixel data (for example, represented by an identifier P_1') and the second column of pixel data (for example, represented by an identifier P_2'), respectively; one column of supplementary pixel data (for example, represented by an identifier P_2) are formed, for example, by an interpolation operation between P_1' and P_2'; and after readjusting the column numbers, P_1' is, for example, P_1, P_2' is, for example, P_3, and the supplementary pixel data column P_2 is between P_1 and P_3. Because the pixel data of P_2 is obtained by performing an interpolation operation on P_1 and P_3, the luminance features of the second column of pixel units corresponding to P_2 are the transition of the first column of pixel units and the third column of pixel units that are adjacent to the front and back of the second column of pixel units, making the transition of the picture more natural.

It should be noted that the j-th column and the (j+1)-th column refer to signal columns, that is, pixel data signal columns, which are different from physical pixel columns of the display panel. The j-th column of pixel data may also be referred to as a j-th pixel data signal column (or a j-th pixel data column), and the (j+1)-th column of pixel data can also be referred to as a (j+1)-th pixel data signal column (or a (j+1)-th pixel data column). Similarly, the "columns" in Q columns, N columns and D columns are all pixel data signal columns, Q columns of pixel data may also be referred to as Q pixel data columns, N columns of pixel data may also be referred to as N pixel data columns, and D columns of supplementary pixel data may also be referred to as D supplementary pixel data columns.

For example, in some embodiments, D is less than or equal to 4, that is, the total number of supplementary pixel data columns generated between any two adjacent pixel data columns in Q columns of pixel data is less than or equal to 4. Based on this method, for a display panel with a resolution of 4K or 8K, a good visual effect can be achieved in the process of displaying images based on the supplemented pixel data, which do not produce obvious picture abnormalities for human eyes.

For example, in the case where N=C*Q (that is, in the case where the horizontal resolution of the display panel is an integer multiple of the horizontal resolution of the image to be displayed), C-1 columns of supplementary pixel data are generated between every two adjacent columns of pixel data in the Q columns of pixel data, and a total of C-1 columns of supplementary pixel data are generated on one or both sides of the Q columns of pixel data to complement the N columns of pixel data, and C is an integer greater than 1. For example, if the total number of columns N of the pixel units is twice the total number of columns Q of the display data, one column of supplementary pixel data can be generated between every two adjacent columns of Q columns of pixel data, and one column of supplementary pixel data can be generated on one side (e.g., left side or right side) of the Q columns of pixel data.

As illustrated in FIG. 12, taking N=2Q as an example, for example, P_1', P_2', . . . , P_3Y' respectively represent Q columns of pixel data, In1, In2 and In3 included in P_1' respectively represent three sub-pixel data included in P_1', and the same for other pixel data. P_1, P_2, . . . , P_6Y respectively represent, for example, the supplemented N columns of pixel data, which are output signals of the resolution conversion module. For example, P_1'~P_3Y' are respectively served as odd-numbered columns P_1, P_3, P_5, . . . , P_(6Y-1) in the output signals, intermediate even-numbered columns of supplementary data signal P_2, P_4, P_6, . . . , P_(6Y-2) are generated between every two adjacent odd-numbered columns, and the supplementary data signal P_6Y is generated in the last even-numbered column.

For example, if the total number of columns N of the pixel units is three times the total number of columns Q of the display data, then two supplementary pixel data columns are generated between every two adjacent columns of the Q columns of pixel data, and two supplementary pixel data columns are generated on one side (left side or right side) of the Q columns of pixel data, or one supplementary pixel data column is generated on both sides of the Q columns of pixel data respectively.

Figure 13:
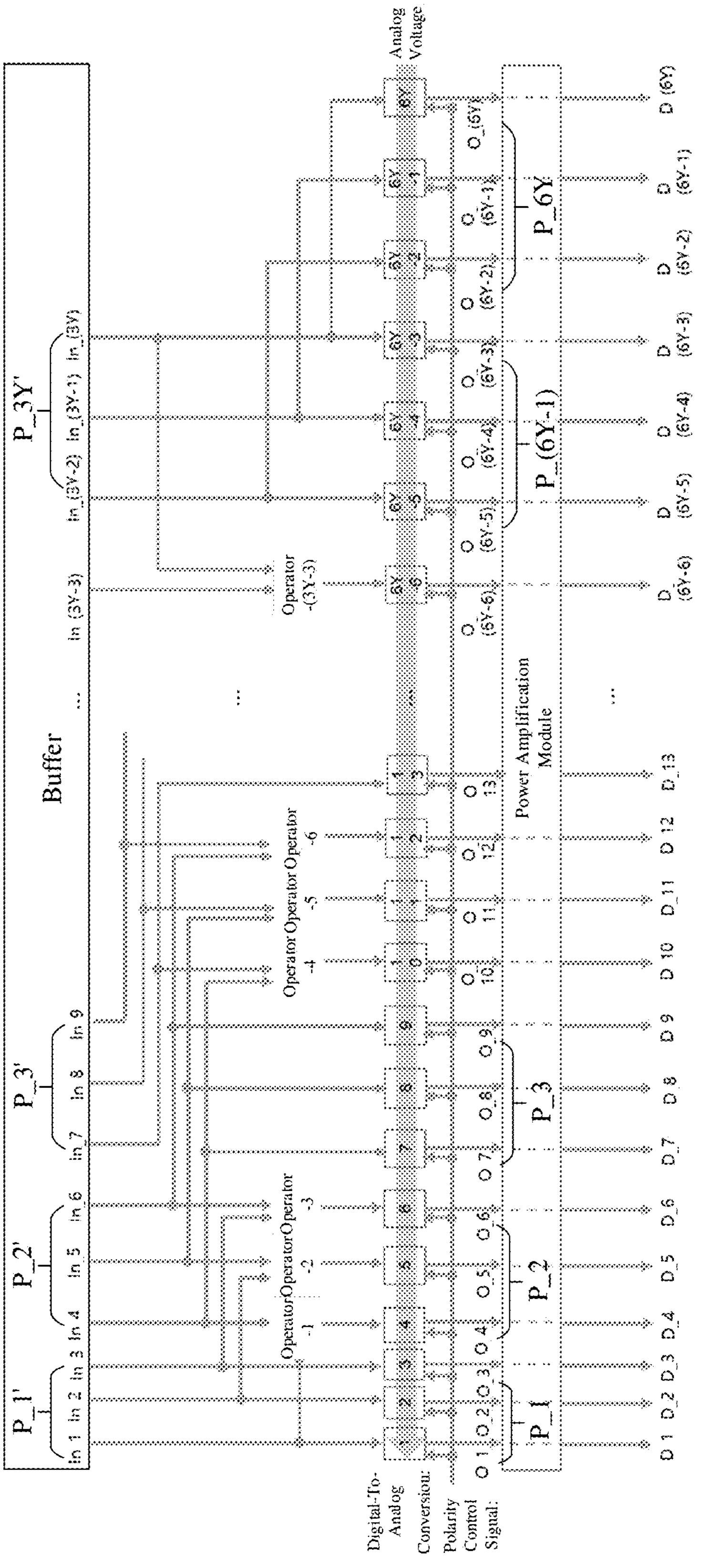
FIG. 13 is a schematic diagram of a resolution control module provided by at least one embodiment of the present disclosure.

FIG. 13 is a schematic diagram of a resolution conversion module provided by at least one embodiment of the present disclosure. As illustrated in FIG. 13, the resolution conversion module includes a plurality of operators, the interpolation operation can be achieved by the operators, each column of pixel signals at the input terminal can be served sequentially as an odd-numbered column at the output terminal, an even-numbered column at the output terminal is used to output the pixel data of two adjacent odd-numbered columns after the pixel data of two adjacent odd-numbered columns have been operated by means of the operators, and the last column of even-numbered columns of pixel data can copy one odd-numbered column of pixel data that is a previous column of the last column. Taking P_1~P_3 as an example, in the process of generating P_2, the sub-pixel data of corresponding color sub-pixels in P_1~P_3 can be performed by the interpolation operation to obtain the sub-pixel data of corresponding color sub-pixels in P_2. For example, In1, In2, and In3 respectively represent the sub-pixel data of a R pixel, the sub-pixel data of a G pixel, and the sub-pixel data of a B pixel, and In4, In5, and In6 respectively represent the sub-pixel data of a R pixel, the sub-pixel data of a G pixel, and the sub-pixel data of a B pixel; the interpolation operation is performed on In1 and In4 to obtain the sub-pixel data O_4 of the R sub-pixel in P_2; the interpolation operation is performed on In2 and In5 to obtain the sub-pixel data O_5 of the G sub-pixel in P_2; and the interpolation operation is performed on In3 and In6 to obtain the sub-pixel data O_6 of the B sub-pixel in P_2. The operator may, for example, be a mean value operator.

Figure 14:
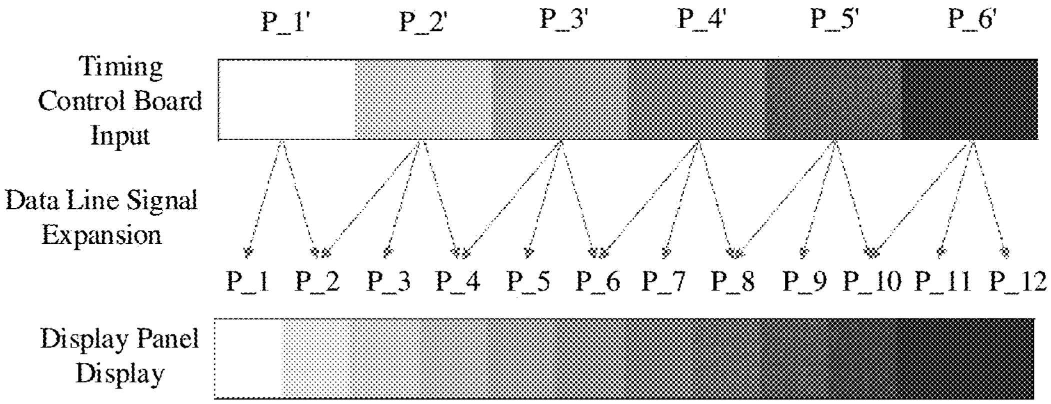
FIG. 14 is a schematic diagram of a gray scale change provided by at least one embodiment of the present disclosure.

FIG. 14 is a schematic diagram of a gray scale change provided by at least one embodiment of the present disclosure. As illustrated in FIG. 14, the example of using the Q columns of pixel data (e.g., P_1'~P_8') as odd-numbered columns of pixel data signals (e.g., P_1, P_3, . . . , P_11) and generating even-numbered columns of supplementary pixel data signals (e.g., P_2, P_4, . . . , P_12) as described above is followed. A upper row of gray scales, for example, represent the luminance features of 6 columns of pixel units respectively corresponding to P_1'~P_6' before the expansion of the pixel data, and a lower row of gray scales, for example, represent the luminance features of 12 columns of pixel units respectively corresponding to P_1~P_12 after the expansion of the pixel data. The value of the even-numbered column of pixel data is an interpolation (for example, a mean value) of the left and right adjacent odd-numbered columns of pixel data, so that the gray scale of the even-numbered column of pixel units is the transition of the gray scales of the adjacent odd-numbered columns of pixel units, which will not cause color confusion, so that the entire display picture after expansion presents a better display effect.

Figure 15:
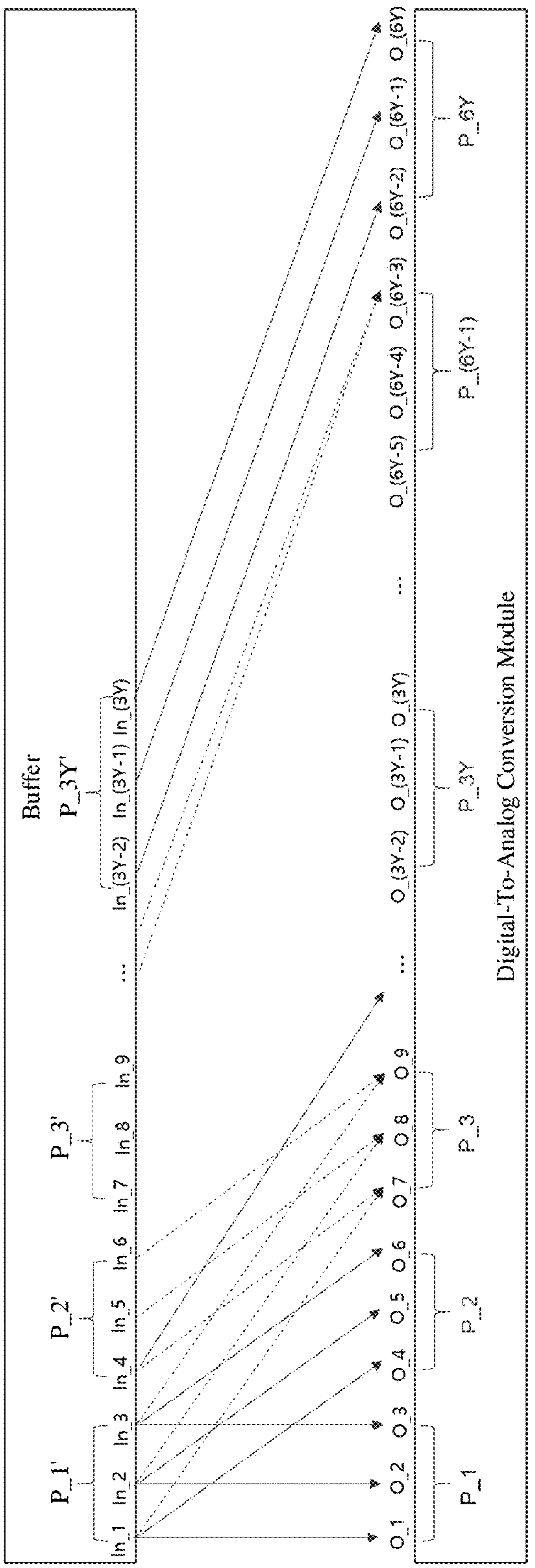
FIG. 15 is a schematic diagram of input pixel data and output pixel data in another source driver provided by at least one embodiment of the present disclosure.

FIG. 15 is a schematic diagram of an input signal and an output signal of another resolution conversion module provided by at least one embodiment of the present disclosure. As illustrated in FIG. 15, also taking the case where N=2Q as an example, P_1'~P_3Y' are respectively used as even-numbered columns P_2, P_4, P_6, . . . , P_6Y in the output signals, the supplementary pixel data are generated in the first column P_1, the first column P_1 can copy the pixel data of the second column P_2, and intermediate odd-numbered columns of supplementary data signals P_1, P_3, P_5, . . . , P_(6Y-1) are generated between two adjacent even-numbered columns.

Figure 16:
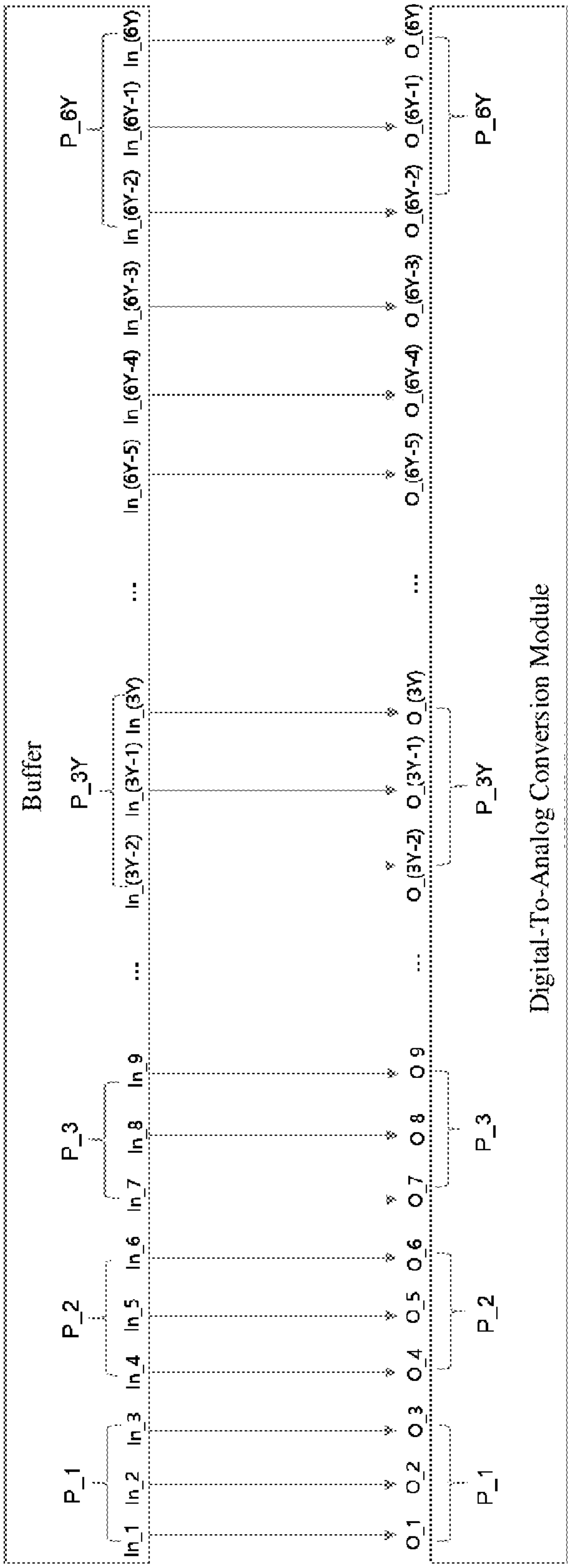
FIG. 16 is a schematic diagram of input pixel data and output pixel data in yet another source driver provided by at least one embodiment of the present disclosure.

FIG. 16 is a schematic diagram of input pixel data and output pixel data in yet another source driver provided by at least one embodiment of the present disclosure. As illustrated in FIG. 16, for example, in the case where Q is equal to N, Q columns of analog data signals are respectively generated based on the Q columns of pixel data, and the Q columns of analog data signals are configured to be respectively input into the N columns of pixel units. In this case, no interpolation operation is required.

Figure 17:
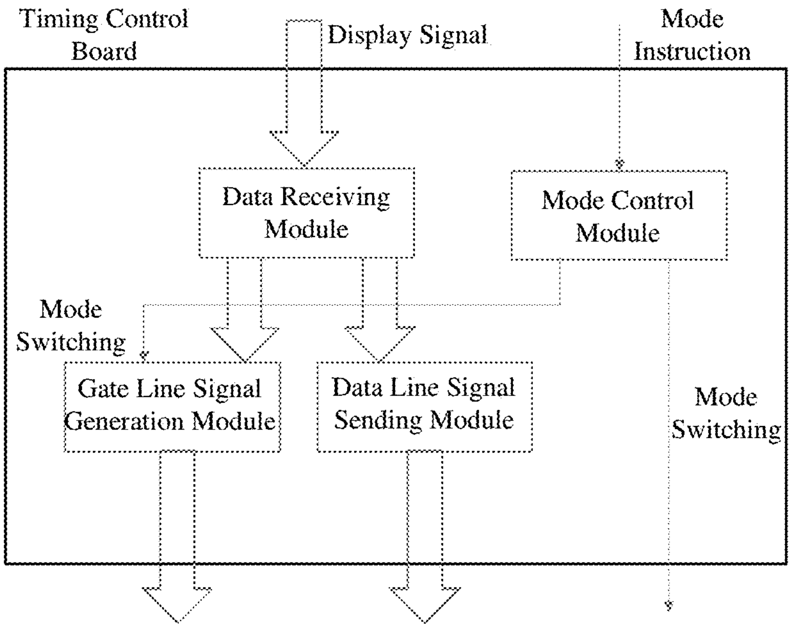
FIG. 17 is a schematic diagram of a timing controller provided by at least one embodiment of the present disclosure.

FIG. 17 is a schematic diagram of another timing controller provided by at least one embodiment of the present disclosure. As illustrated in FIG. 17, for example, the timing controller further includes a mode control module, and the mode control module is configured to receive a mode instruction, and send a control signal to the gate signal generation module and/or the source driver chip based on the mode instruction to control whether the gate signal generation module performs the gate signal supplement operation and/or control whether the source driver chip performs the data supplement operation. The mode instruction can be obtained by automatically detecting the resolution of the image to be displayed and comparing the resolution with the physical resolution of the display panel, or can be obtained through user input.

Figure 18:
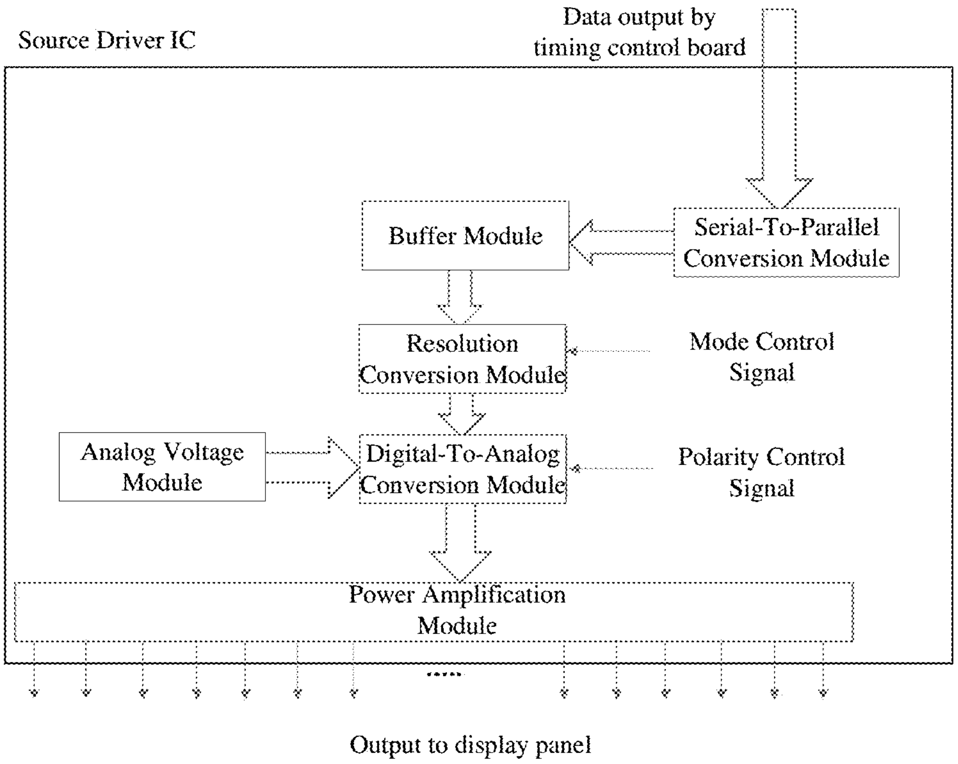
FIG. 18 is a schematic diagram of a source driver chip provided by at least one embodiment of the present disclosure.

FIG. 18 is a schematic diagram of another source driver chip provided by at least one embodiment of the present disclosure. As illustrated in FIG. 18, for example, the control signal (mode control signal) sent by the timing controller to the source driver chip can act on the resolution conversion module to control the resolution conversion module to perform or not perform the data supplement operation.

For example, a mode control module is added to the timing control board, which is responsible for receiving and sending mode instructions. On the one hand, a mode switching instruction may be sent to the gate line signal generation module to select whether to use the interpolation operation function; on the other hand, a mode switching instruction may be sent to the source driver IC to adjust the ratio of the total number of input and output signals of the source driver IC. The turning on and off of the interpolation operation function can be achieved by adding a switching device at its front end.

Figure 19:
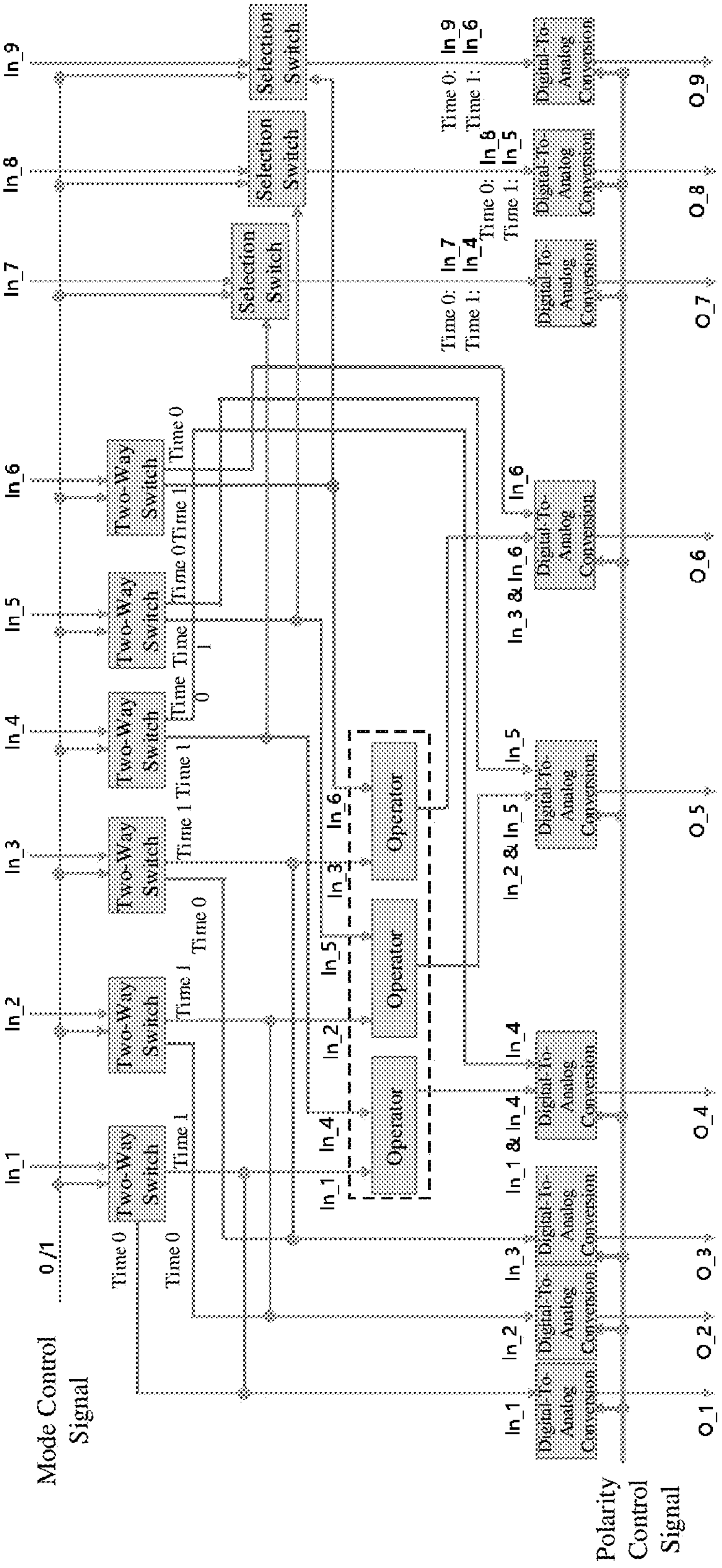
FIG. 19 is a schematic diagram of a resolution conversion module provided by at least one embodiment of the present disclosure.

FIG. 19 is a schematic diagram of another resolution conversion module provided by at least one embodiment of the present disclosure. As illustrated in FIG. 19, the resolution conversion module further includes a plurality of two-way switches and a mode switching module (not illustrated in the figure). Each two-way switch includes an input terminal and two output terminals, the input terminal of the two-way switch is connected to the buffer module for receiving a column of pixel data, one of the two output terminals is connected to at least one of the plurality of digital-to-analog conversion modules, and the other of the two output terminals is connected to at least one of the plurality of operation modules. The mode switching module is configured to control the two-way switch to output the column of pixel data to one of the two output terminals based on a control signal sent by the mode control module. For example, the working modes of the display apparatus include a normal mode and a resolution expansion mode. In the normal mode, the two-way switch directly outputs a signal to the digital-to-analog conversion module without an interpolation operation; and in the resolution expansion mode, the two-way switch outputs a signal to an operator, the signal is input to the digital-to-analog conversion module after the signal is performed by an interpolation operation.

For example, when it is detected that the resolution of the display signal matches the physical resolution of the display panel, the mode instruction is the normal mode. In the normal mode, on the one hand, the timing control board sends a normal mode control instruction to a gate signal generator, the interpolation operation function of the gate signal generator is turned off, and the output gate scan signals correspond to the gate lines of the display panel one by one, as illustrated in FIG. 7. On the other hand, the timing control board sends a normal mode control instruction to the source driver IC, the input path of the two-way switch and the output path of the two-way switch in the resolution conversion module are the input and output of the same number, the output signal does not pass through the operator, and the operator of the source driver IC does not work, as illustrated in FIG. 16.

For example, in the case where the resolution of the display signal received by the timing control board does not match the physical resolution of the display panel, the mode instruction is the resolution expansion mode.

For example, in some embodiments, in the case where the vertical resolution of the display signal is half of the vertical resolution of the display panel and the horizontal resolution of the display signal is identical to the horizontal resolution of the display panel, the timing control board sends a vertical resolution expansion mode control instruction to a gate line signal generator to start the interpolation operation function, as illustrated in FIG. 12 or FIG. 15. The timing control board sends a normal mode control instruction to the source driver IC, so that inputs of the source driver IC correspond to outputs of the source driver IC one by one.

For example, in some other embodiments, in the case where the horizontal resolution of the display signal is half of the horizontal resolution of the display panel and the vertical resolution of the display signal is identical to the vertical resolution of the display panel, the timing control board sends a normal mode control instruction to the gate line signal generator, the interpolation operation function is turned off, and the output gate line signals correspond to the gate lines of the display panel one by one. The timing control board sends a horizontal resolution expansion mode control instruction to the source driver IC, at this time, the two-way switch in the source driver IC directs the input signal to the operator. For example, input channels In_1, In_2, and In_3 correspond to the first three output channels O_1, O_2, O_3; operator 1 outputs interpolation operation results of In_1 and In_4, corresponding to output channel O_4; operator 2 outputs interpolation operation results of In_2 and In_5, corresponding to output channel O_5; operator 3 outputs interpolation operation results of In_3 and In_6, corresponding to output channel O_6; selection switch 1 outputs In_4, corresponding to output channel O_7; selection switch 2 outputs In_5, corresponding to output channel O_8; selection switch 3 outputs In_6, corresponding to output channel O_9; and by analogy, the input columns are sequentially used as the odd-numbered columns of the output, and the even-numbered columns are operation results of the two adjacent odd-numbered columns to change the ratio of the digital data signals received by the source driver IC and the output analog data signals to 1:2.

For example, in some other embodiments, in the case where the horizontal resolution of the display signal is half of the horizontal resolution of the display panel and the vertical resolution of the display signal is also half of the vertical resolution of the display panel, the timing control board sends a vertical resolution expansion mode control instruction to the gate signal generator, the interpolation operation function is turned on, and the ratio of the output gate signals to the gate lines of the display panel is 1:1. The timing control board sends a horizontal resolution expansion mode control instruction to the source driver IC, and the ratio of input to output is 1:2.

Figure 20:
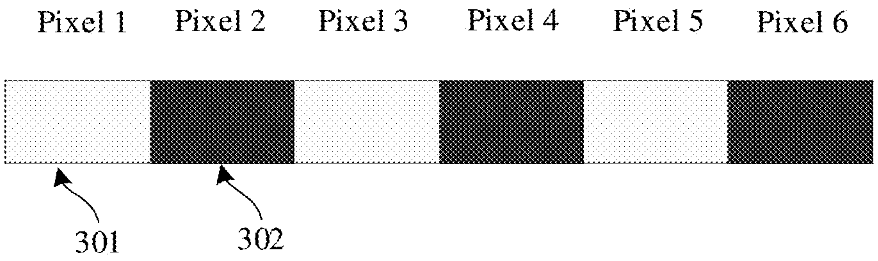
FIG. 20 is a schematic diagram of an image to be displayed conforming to an alternating display rule provided by at least one embodiment of the present disclosure.

FIG. 20 is a schematic diagram of an image to be displayed provided by at least one embodiment of the present disclosure. As illustrated in FIG. 20, in some cases, a plurality of consecutive frames of images to be displayed all have a picture in which two luminance features are displayed alternately in different columns, for example, presenting a picture in which the brightest feature 301 and the darkest feature 302 are displayed alternately in different columns. Alternatively, more than two brightness features are displayed alternately in different columns, for example, three or four brightness features are displayed alternately. For this type of picture, if the supplementary pixel data is obtained by performing an interpolation operation using two adjacent columns of pixel data, there will be brightness features that do not exist in the picture. For example, performing an interpolation operation on the brightest feature 301 and the darkest feature 302 will generate a gray scale feature between the brightest and darkest, which will cause picture distortion. In order to avoid this problem, the following methods can be used to deal with it.

For example, it may first be determined whether display data of a plurality of consecutive frames of images to be displayed conforms to an alternating display rule, Q columns of pixel data of the display data conforming to the alternating display rule cycle between g pixel values, and the g pixel values correspond to g luminance features (for example, two or more luminance features), respectively. If yes, the plurality of frames of images to be displayed are divided into a plurality of image groups, each image group includes adjacent g frames of images to be displayed, and following operations are performed for each image group: if a current frame of an image to be displayed is a k-th frame of an image to be displayed of the image group, transforming all Q columns of pixel data of the k-th frame of an image to be displayed to a k-th pixel value in the g pixel values; performing the data supplement operation for the Q columns of pixel data that are transformed; generating an analog data signal based on a (k+n*g)-th column of pixel data after the data supplement operation and inputting the analog data signal into a (k+n*g)-th column of pixel units to cause the (k+n*g)-th column of pixel units to be displayed as a k-th luminance feature in the g luminance features, and in the case where k is a positive integer greater than 1, remaining columns of pixel units other than the (k+n*g)-th column of pixel units are displayed as luminance features corresponding to a previous frame of an image to be displayed of the k-th frame of the image to be displayed; and in the case where k is equal to 1, the remaining columns of pixel units other than the (k+n*g)-th column of pixel units are not displayed, n takes all integers from 0 to [Q/g−1], g is an integer greater than 1 and less than Q, and k is an integer less than or equal to g.

For example, an image recognition function is added to the timing control board to recognize a special display picture, which has at least two brightness features and is displayed alternately in columns.

Figure 21:
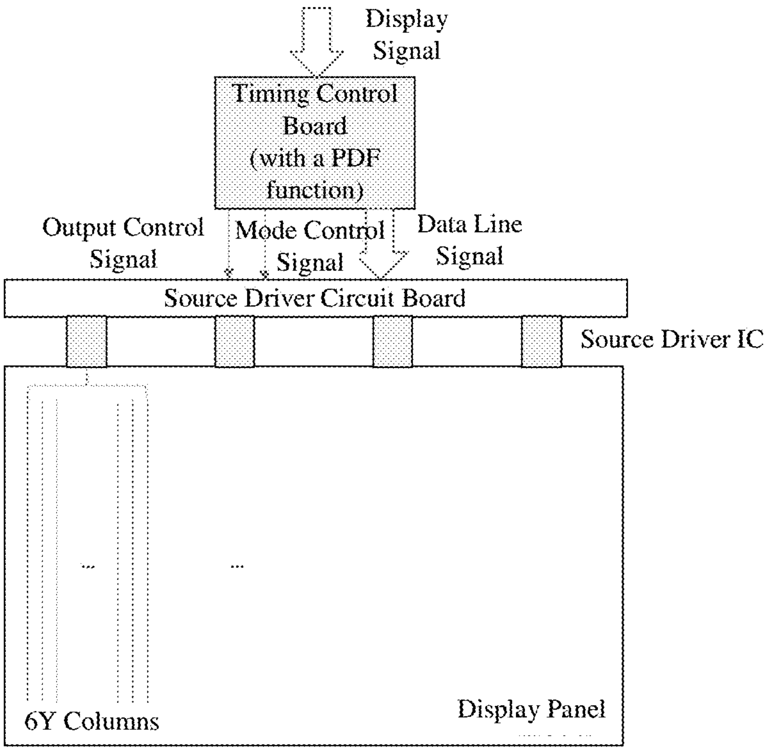
FIG. 21 is a schematic diagram of another display apparatus provided by at least one embodiment of the present disclosure.
Figure 22:
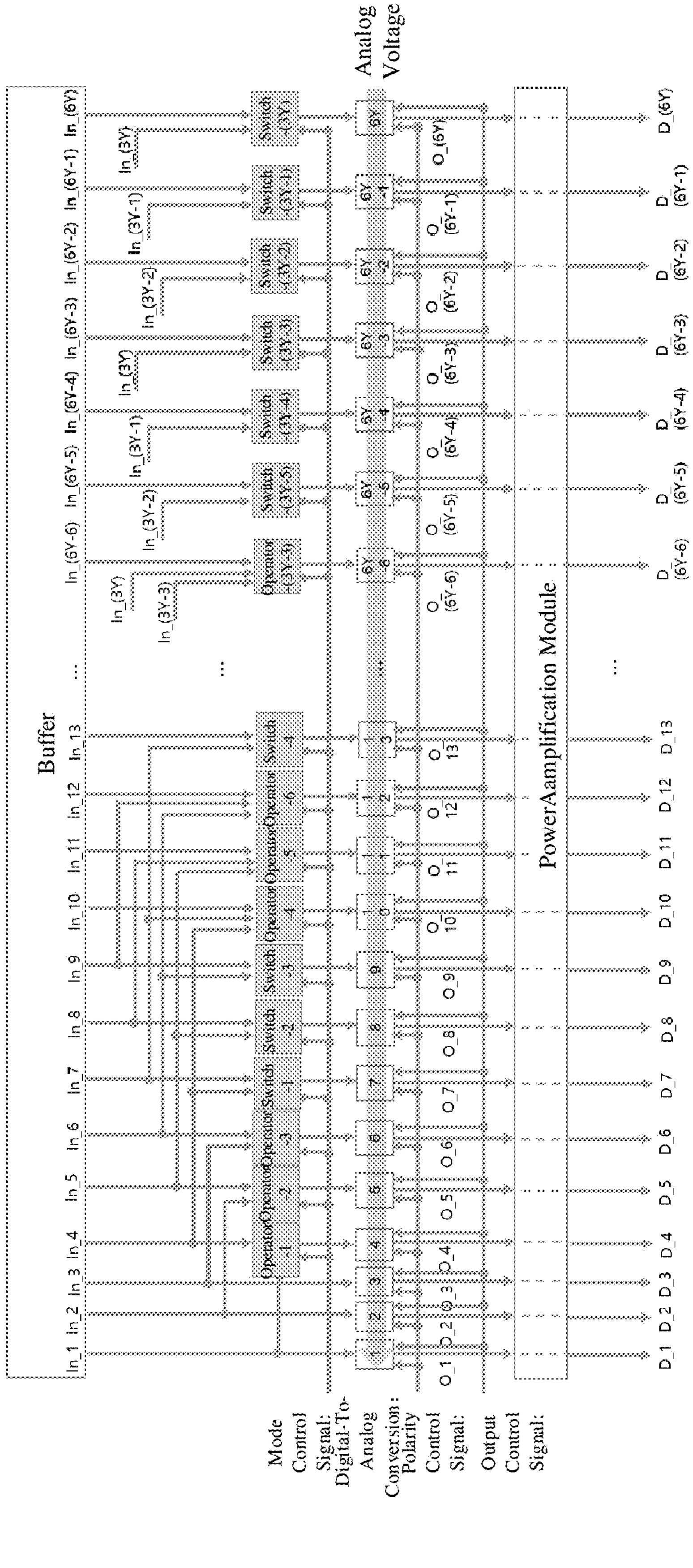
FIG. 22 is a schematic diagram of another resolution conversion module provided by at least one embodiment of the present disclosure.

As illustrated in FIG. 20, as an example, two luminance features are displayed alternately in respective columns, that is, displayed cyclically between two pixel values, for example, displayed alternately between the brightest and the darkest. FIG. 21 is a schematic diagram of another display apparatus provided by at least one embodiment of the present disclosure. As illustrated in FIG. 21, the timing control board outputs a control signal to the source driver IC to control the turning-on and turning-off of the output channels, and then control whether the corresponding column of sub-pixels are displayed. FIG. 22 is a schematic diagram of another resolution conversion module provided by at least one embodiment of the present disclosure. As illustrated in FIG. 22, a switch module is added to the resolution conversion module, and the switch module can turn off or turn on the digital-to-analog conversion function of the corresponding column.

Figure 23:
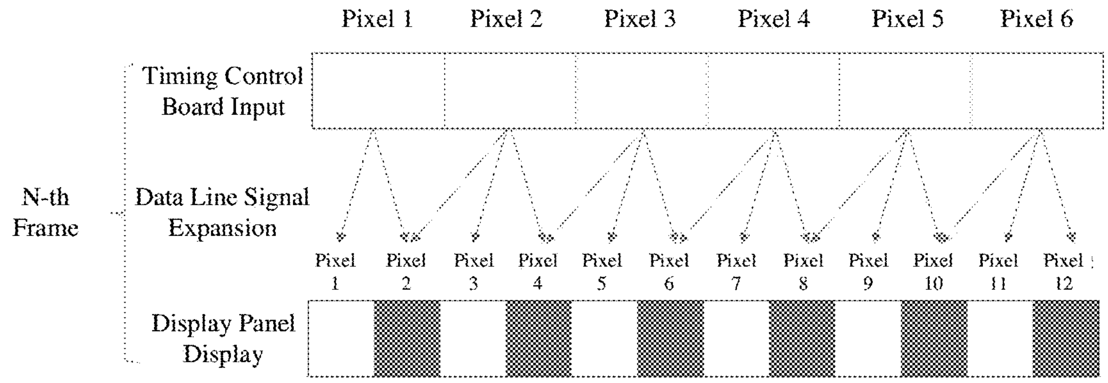
FIG. 23 is a schematic diagram of a display picture provided by at least one embodiment of the present disclosure.
Figure 24:
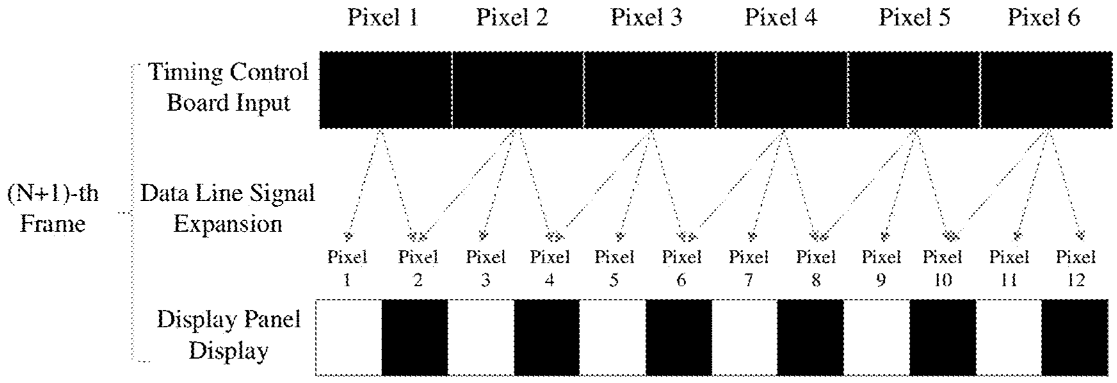
FIG. 24 is a schematic diagram of another display picture provided by at least one embodiment of the present disclosure.

For example, if no display picture meeting the requirements is detected, the timing control board outputs a picture normally and outputs a control signal to control all output channels of the source driver IC to be turned on and output normally, and the interpolation operation is performed in the case where the horizontal resolution is insufficient. If the timing control board detects a special display picture (such as a picture in which two luminance features are displayed alternately in different columns) and the horizontal resolution is insufficient, the timing control board can split the picture according to the luminance features and form a full-region picture for each feature, which is output alternately in sequence; at the same time, when any feature picture is displayed, the output channels of the source driver IC corresponding to other features are turned off by outputting control signals. Take the case where two luminance features are displayed alternately as an example, as illustrated in FIG. 23, for the E-th frame of picture (E is a positive integer), the timing control board outputs the brightest (first feature) display picture in the entire region to the source driver IC, that is, the odd-numbered columns of input data are the brightest, and the even-numbered columns of calculation results are also the brightest; at the same time, an output control signal is sent to the source driver IC to turn off the digital-to-analog conversion module for the even-numbered pixel columns corresponding to the darkest (second feature), that is, 4/5/6, and 10/11/12 . . . are turned off, and at this time, the odd-numbered columns of input signals are displayed as the brightest, and the even-numbered columns are displayed as the picture of the previous frame (the (E-1)-th frame), which is assumed to be of a certain gray scale. As illustrated in FIG. 24, when the (E+1)-th frame is displayed, the darkest (feature 2) display picture of the entire region is output to the source driver IC, that is, each column is the darkest, and at the same time, an output control signal is sent to the source driver IC to turn off the digital-to-analog conversion module for the odd-numbered pixel columns corresponding to the brightest (feature 1), that is, 1/2/3, and 7/8/9 . . . are turned off, and at this time, the even-numbered columns of inputs are the darkest, and the operation result is the darkest as well, that is, the output displays the darkest, and at this time, the odd-numbered columns are displayed as the picture of the previous frame, which is the brightest.

Repeating the actions of the E-th frame and the (E+1)-th frame, and the picture is always kept as FIG. 24, that is, the display of the special picture is achieved.

For example, the same is true for the case where more than two luminance features are displayed alternately. For the convenience of description, a plurality of frames of images to be displayed are grouped according to the total number of luminance features, and the total number of images to be displayed in each group is equal to the total number of luminance features. Taking the case where 12 consecutive frames of images to be displayed showing three color features (the first feature, the second feature and the third feature) are displayed alternately in different columns as an example, the 12 frames of images are divided into 4 groups, and each group contains 3 frames of images. For the first frame of image in each group, this first frame of image is transformed to display the first feature in the full region, and after performing the interpolation operation, the first, fourth (i.e., 1+3), seventh (i.e., 1+2*3) and tenth (i.e., 1+3*3) columns are made to perform a digital-to-analog conversion in order to make the pixel units in these columns present the first feature, and the remaining columns (2-3, 5-6, 8-9, and 11-12) are presented as the features of corresponding columns in the previous frame of image, or if there is no previous frame, these columns are not displayed. For the second frame of image in each group, this second frame of image is transformed to display the second feature in the full region, and after performing the interpolation operation, the second, fifth (i.e., 2+3), eighth (i.e., 2+2*3) and eleventh (i.e., 2+3*3) columns are made to perform a digital-to-analog conversion in order to make the pixel units in these columns present the second feature, and the remaining columns are presented as the features of corresponding columns in the previous frame of image, that is, the first, fourth, seventh and tenth columns still present the first feature. For the third frame of image in each group, this third frame of image is transformed to display the third feature in the full region, and after performing the interpolation operation, the third, sixth (i.e., 3+3), ninth (i.e., 3+2*3) and twelfth (i.e., 3+3*3) columns are made to perform a digital-to-analog conversion in order to make the pixel units in these columns present the third feature, and the remaining columns are presented as the previous frame of image, that is, the first, fourth, seventh and tenth columns still present the first feature, and the second, fifth, eighth and eleventh still present the second feature, so that every three columns of pixel units present the first feature, the second feature and the third feature in sequence. For the next group of images, the above-mentioned method is still adopted, a picture in which the first feature, the second feature, and the third feature are presented alternately in every frame can be achieved, and the display of such a special picture is achieved.

Based on the above-mentioned method, for a picture with insufficient horizontal resolution and a specific number of luminance features alternately displayed in different columns, not only the purpose of increasing the horizontal resolution can be achieved, but also unnecessary luminance features can be avoided during interpolation to ensure the picture display effect.

For example, in some embodiments, in the case where the vertical resolution of the display signal is half of the physical resolution of the display panel, the vertical resolution is extended: the timing control board interpolates the gate line signals, the frequency of the row signal is doubled, and the output of the data line signal remains unchanged, that is, the data time of one row before the interpolation operation corresponds to the data time of two rows after the interpolation operation; the first row or the last row without two adjacent rows is inserted early or late with reference to the phase difference of other rows after interpolated.

For example, in some embodiments, in the case where the horizontal resolution of the display signal is half of the physical resolution of the display panel, the horizontal resolution is extended: the resolution conversion module of the source driver IC sequentially takes each column of pixel data signal at the input terminal as an odd-numbered column or an even-numbered column of the output, and the other half of the output is computed from the two adjacent columns thereof; if there are no two adjacent columns for the first or last column at the output terminal, the first or last column of the output data follows the first or last column of the input data; the resolution conversion module is between the buffer and the digital-to-analog conversion module, and the conversion action is completed before the signal enters the digital-to-analog conversion module; the conversion action of the resolution conversion module is carried out by a corresponding sub-pixel, and no conversion or calculation is carried out between different sub-pixels; and the operator between adjacent columns is an analog circuit operation device.

For example, in some embodiments, the functions of vertical resolution expansion and horizontal resolution expansion are relatively independent and do not interfere with each other.

For example, in some embodiments, a display panel architecture matching the signal processing method of the embodiments of the present disclosure is as follows: the gate lines are arranged along the horizontal direction, and the data lines are arranged along the vertical direction; a pixel unit includes a plurality of sub-pixels, which are arranged along the direction of the gate lines; and the same column of sub-pixels are all of the same sub-pixel and are of the same polarity in a frame time.

For example, in some embodiments, a mode control function is provided to perform processing corresponding to a case in which the vertical resolution of the display signal is half of the physical resolution of the display panel and the horizontal resolution of the display signal is identical to the horizontal resolution of the physical resolution of the display panel, a case in which the horizontal resolution of the display signal is half of the physical resolution of the display panel and the vertical resolution of the display signal is identical to the vertical resolution of the physical resolution of the display panel, a case in which both the vertical resolution and the horizontal resolution of the display signal are half of the physical resolution of the display panel, and a case in which both the vertical resolution and the horizontal resolution of the display signal are identical to the physical resolution of the display panel, respectively.

For example, in some embodiments, the timing control board receives a mode instruction; the timing control board sends the mode instruction to the gate line signal generation module to adjust the total number of the output row signals; and the timing control board sends the mode instruction to the source driver IC to switch the ratio of input signals to output signals between, for example, 1:1 and 1:2.

For example, in some embodiments, the gate line signal generation module adjusts the total number of output row signals in the following manner: a control switch is added before the interpolation operation function, and in the case where the vertical resolution is half of the display panel, the control switch is turned on, the interpolation operation function is enabled, and the interpolated row gate line signals are output after the operation, otherwise the control switch is turned off, and the total number of output signals remains unchanged.

For example, in some embodiments, the total number of input channels of the source driver IC is the same as the total number of output channels of the source driver IC, and the channel connection method for proportional switching between the input and output signals of the source driver IC is as follows: for the first half of the input channels of the source driver IC, sequentially connecting to the first half of the output channels one by one after connecting to the switching devices, sequentially connecting to the odd-numbered or even-numbered columns of the output terminals one by one after connecting to the switching devices, and after connecting to the switching devices, every two operate on each other, and the output ports of the operator are sequentially connected to the even-numbered channels or odd-numbered channels; and for the second half of the input channels, sequentially connecting to the second half of the output channels one by one after connecting to the switching devices. The switching device is controlled by a mode instruction, in the case where the horizontal resolution of the display signal is half of the display panel, the second half of the input channels are turned off by switches, the first half of the input channels are turned on by switches, and the output is output to the odd-numbered columns or even-numbered columns of the output terminals, and the operator; in the case where the horizontal resolution of the display signal is identical to the horizontal resolution of the display panel, the second half of the input channels are turned on by switches; and the first half of the input channels are turned on by switches, and the output is output to the first half of the output channels.

For example, in some embodiments, the timing control board has a picture recognition function, which can recognize a special picture and adjust the output graphics according to the features of the special picture, send a corresponding output control instruction to the source driver IC, carry out a time-sharing display, and ultimately form the desired picture after superposition. The special picture has at least two brightness features that are displayed alternately in different columns. The timing control board splits the recognized special picture according to the total number of features and forms a full-region picture for each feature, which is output alternately in sequence. When the timing control board outputs a full-region image of a certain feature, the timing control board outputs a control signal to the source driver IC and closes the output channels corresponding to other features. The control signal controls the output mode of each channel of the source driver IC, which may be to control the turning-on and turning-off of each digital-to-analog conversion module, or to control the turning-on and turning-off of each channel of the power amplification module.

In the signal processing method of some embodiments of the present disclosure, the display system can perform normal display in the case where the vertical resolution and/or horizontal resolution of the display signal does not match the vertical resolution and/or horizontal resolution of the display panel (e.g., the vertical resolution and/or horizontal resolution of the display signal is half of the physical resolution of the display panel).

The signal processing method of some embodiments of the present disclosure achieves that the physical resolution of the display panel is greater than the resolution of the display signal, and the display effect is close to the display effect corresponding to the physical resolution of the display panel.

The signal processing method of some embodiments of the present disclosure, by reducing the requirements for the resolution of the display signal, can reduce the requirements for the system chip that outputs the display signal, reduce the requirements for the data transmission rate between the system board and the timing control board, reduce the requirements for the data transmission rate between the timing control board and the source driver chip, reduce the requirements for the timing control chip and the source driver chip, and thus greatly reduce the costs; and in the face of the requirements for ultra-high resolution and ultra-high refresh rate panels, it makes the requirements casier to achieve and lower the cost.

The signal processing method of some embodiments of the present disclosure can also output normally in the case where the resolution of the display signal is identical to the resolution of the display panel, which improves the flexibility.

In the signal processing method of some embodiments of the present disclosure, the source driver IC has universal applicability, which avoids the increase of the use cost.

The signal processing method of some embodiments of the present disclosure solves the problem that special pictures such as vertically spaced columns display cannot be displayed normally, which improves the display quality.

The signal processing method of some embodiments of the present disclosure improves the charging rate by doubling the pixel charging time, reduces image quality problems caused by insufficient charging, and improves the image quality.

The embodiments of the present disclosure further provide a display apparatus. As illustrated in FIG. 1 or FIG. 4, the display apparatus includes a display substrate and a timing controller, and the display substrate includes M rows and N columns of pixel units arranged in an array; and the timing controller includes a data receiving module and a gate signal generation module.

The data receiving module is configured to acquire display data of a frame of image to be displayed, and the display data include P rows and Q columns of pixel data arranged in an array. The gate signal generation module is configured to: generate P rows of gate scan signals corresponding to the P rows of pixel data; perform a gate signal supplement operation in the case where P is less than M, in which the gate signal supplement operation includes generating M-P rows of supplementary gate scan signals based on the P rows of gate scan signals, and the P rows of gate scan signals and the M-P rows of supplementary gate scan signals form M rows of gate scan signals to drive the M rows of pixel units using the M rows of gate scan signals, respectively; and P, Q, M and N are all positive integers.

For example, the display apparatus further includes a source driver chip, and the source driver chip is connected to the M rows and N columns of pixel units through a plurality of data signal lines extending along a second direction intersecting with a first direction to provide analog data signals to the M rows and N columns of pixel units; the source driver chip is configured to perform a data supplement operation in the case where Q is less than N, and the data supplement operation includes: generating N-Q columns of supplementary pixel data based on the Q columns of pixel data, in which the Q columns of pixel data and the N-Q columns of supplementary pixel data form N columns of pixel data; generating N columns of analog data signals based on the N columns of pixel data; and inputting the N columns of analog data signals respectively into the N columns of pixel units.

For example, the source driver chip includes a buffer module, a plurality of operation modules, and a plurality of digital-to-analog conversion modules. The buffer module is configured to buffer the display data; the plurality of operation modules are configured to perform the data supplement operation to obtain the N-Q columns of supplementary pixel data; and the plurality of digital-to-analog conversion modules are configured to convert the N columns of pixel data into the N columns of analog data signals.

For example, the timing controller further includes a mode control module, and the mode control module is configured to receive a mode instruction, and send a control signal to the gate signal generation module and/or the source driver chip based on the mode instruction to control whether the gate signal generation module performs the gate signal supplement operation and/or control whether the source driver chip performs the data supplement operation.

For example, the source driver chip further includes a plurality of two-way switches and a mode switching modules, each two-way switch includes an input terminal and two output terminals, the input terminal is connected to the buffer module for receiving a column of pixel data, one of the two output terminals is connected to at least one of the plurality of digital-to-analog conversion modules, and the other of the two output terminals is connected to at least one of the plurality of operation modules; and the mode switching module is configured to control the two-way switch to output the column of pixel data to one of the two output terminals based on a control signal sent by the mode control module.

For example, the timing controller further includes an image recognition module, and the image recognition module is configured to: recognize whether display data of a plurality of consecutive frames of images to be displayed conforms to an alternating display rule, in which Q columns of pixel data of the display data conforming to the alternating display rule cycle between g pixel values, and the g pixel values correspond to g luminance features, respectively; and if yes, divide the plurality of frames of images to be displayed into a plurality of image groups, in which each image group includes adjacent g frames of images to be displayed, and following operations are performed for each image group: if a current frame of an image to be displayed is a k-th frame of an image to be displayed of the image group, transform all Q columns of pixel data of the k-th frame of an image to be displayed to a k-th pixel value in the g pixel values; and output the Q columns of pixel data that are transformed to the source driver chip.

The source driver chip is further configured to: perform the data supplement operation for the Q columns of pixel data that are transformed; and generate an analog data signal based on a (k+n*g)-th column of pixel data after the data supplement operation and input the analog data signal into a (k+n*g)-th column of pixel units to cause the (k+n*g)-th column of pixel units to be displayed as a k-th luminance feature in the g luminance features; in the case where k is a positive integer greater than 1, remaining columns of pixel units other than the (k+n*g)-th column of pixel units are displayed as luminance features corresponding to a previous frame of an image to be displayed of the k-th frame of the image to be displayed; and in the case where k is equal to 1, the remaining columns of pixel units other than the (k+n*g)-th column of pixel units are not displayed; and n takes all integers from 0 to [Q/g−1], g is an integer greater than 1 and less than Q, and k is an integer less than or equal to g.

At least one embodiment of the present disclosure provides an electronic device, including the display apparatus provided by any embodiment of the present disclosure. For example, the electronic device may include any electronic product with a display function such as a mobile phone, a tablet computer, a television, a monitor, a notebook computer, a digital photo frame, a navigator, and the like.

Figure 25:
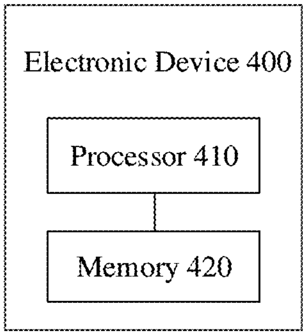
FIG. 25 is a schematic block diagram of an electronic device provided by some embodiments of the present disclosure.

FIG. 25 illustrates a schematic block diagram of an electronic device provided by some embodiments of the present disclosure. As illustrated in FIG. 25, the electronic device 400 includes a processor 410 and a memory 420. The memory 420 is configured to store non-transitory computer-readable instructions (e.g., one or more computer program modules). The processor 410 is configured to execute the non-transitory computer-readable instructions, and when the non-transitory computer-readable instructions are executed by the processor 410, one or more steps in the signal processing method described above are performed. The memory 420 and the processor 410 may be interconnected by a bus system and/or other forms of connection mechanisms (not illustrated).

For example, the processor 410 is a central processing unit (CPU), a graphics processing unit (GPU), or other forms of processing units having data processing capabilities and/or program execution capabilities. For example, the central processing unit (CPU) may be an X86 or ARM architecture, and the like. The processor 410 may be a general-purpose processor or a special-purpose processor, and can control other components in the electronic device 400 to perform desired functions.

For example, the memory 420 includes any combination of one or more computer program products, which may include various forms of computer-readable storage media, such as volatile memory and/or non-volatile memory. The volatile memory may include, for example, random access memory (RAM) and/or cache memory, etc. The non-volatile memory may include, for example, read-only memory (ROM), hard disk, erasable programmable read-only memory (EPROM), compact disk read-only memory (CD-ROM), USB memory, flash memory, and the like. One or more computer program modules can be stored on the computer-readable storage medium, and the processor 410 can execute one or more computer program modules to achieve various functions of the electronic device 400. Various application programs, various data, and various data used and/or generated by the application programs can also be stored in the computer-readable storage medium.

It should be noted that, in the embodiments of the present disclosure, the specific functions and technical effects of the electronic device 400 can refer to the above description about the signal processing method, which will not be repeated here.

Figure 26:
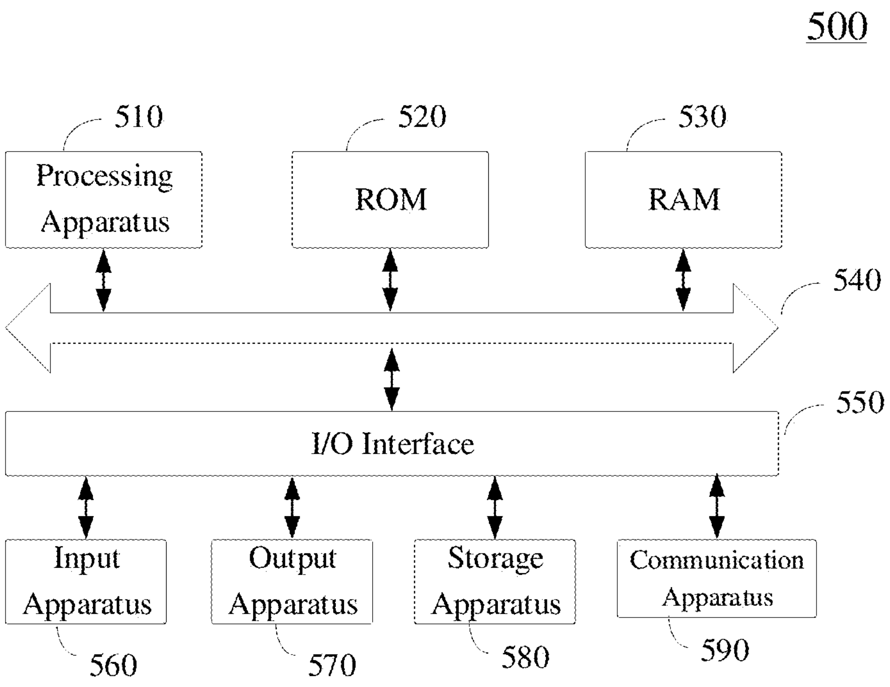
FIG. 26 is a schematic block diagram of another electronic device provided by some embodiments of the present disclosure.

FIG. 26 illustrates a schematic block diagram of another electronic device provided by some embodiments of the present disclosure. The electronic device 500 is, for example, suitable for implementing the signal processing method provided by the embodiments of the present disclosure. The electronic device 500 may be a terminal device or the like. It should be noted that the electronic device 500 illustrated in FIG. 26 is only an example, which does not limit the functions and application scope of the embodiments of the present disclosure.

As illustrated in FIG. 26, the electronic device 500 includes a processing apparatus 510 (such as a central processing unit, a graphics processing unit, etc.) that can perform various appropriate actions and processes in accordance with a program stored in read-only memory (ROM) 520 or loaded from a storage apparatus 580 into random access memory (RAM) 530. In the RAM 530, various programs and data required for the operation of the electronic device 500 are also stored. The processing apparatus 510, the ROM 520 and the RAM 530 are connected to each other through a bus 540. An input/output (I/O) interface 550 is also connected to the bus 540.

Usually, the following apparatus may be connected to the I/O interface 550: an input apparatus 560 including, for example, a touch screen, a touch pad, a keyboard, a mouse, a camera, a microphone, an accelerometer, a gyroscope, or the like; an output apparatus 570 including, for example, a liquid crystal display (LCD), a loudspeaker, a vibrator, or the like; the storage apparatus 580 including, for example, a magnetic tape, a hard disk, or the like; and a communication apparatus 590. The communication apparatus 590 may allow the electronic device 500 to be in wireless or wired communication with other devices to exchange data. While FIG. 26 illustrates the electronic device 500 having various apparatuses, it should be understood that not all of the illustrated apparatuses are necessarily implemented or included, and the electronic device 500 may alternatively implement or have more or fewer apparatuses.

For example, according to the embodiments of the present disclosure, the signal processing method described above can be implemented as a computer software program. For example, the embodiments of the present disclosure include a computer program product, which includes a computer program carried by a non-transitory computer-readable medium, and the computer program includes program codes for performing the control method described above. In such embodiments, the computer program may be downloaded online through the communication apparatus 590 and installed, or may be installed from the storage apparatus 580, or may be installed from the ROM 520. When the computer program is executed by the processing apparatus 510, the functions defined in the signal processing method provided by the embodiments of the present disclosure can be achieved.

At least one embodiment of the present disclosure further provides a computer-readable storage medium for storing non-transitory computer-readable instructions, and when the non-transitory computer-readable instructions are executed by a computer, the above-mentioned signal processing method is achieved.

Figure 27:
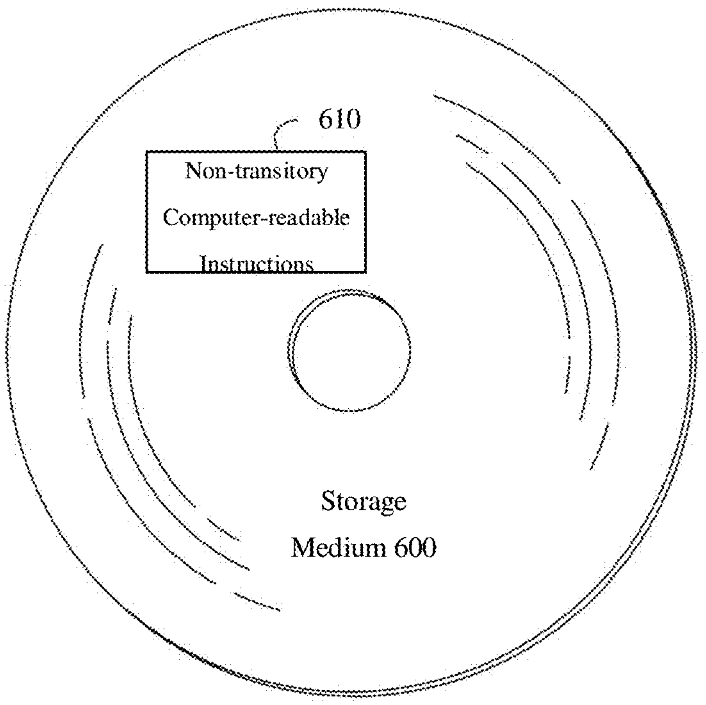
FIG. 27 is a schematic diagram of a storage medium provided by some embodiments of the present disclosure.

FIG. 27 illustrates a schematic diagram of a storage medium provided by some embodiments of the present disclosure. As illustrated in FIG. 27, the storage medium 600 is configured to store non-transitory computer-readable instructions 610. For example, when the non-transitory computer-readable instructions 610 are executed by a computer, one or more steps in the signal processing method described above may be performed.

For example, the storage medium 600 can be applied to the above-mentioned electronic device 400. For example, the storage medium 600 is the memory 420 in the electronic device 400 illustrated in FIG. 25. For example, the relevant descriptions about the storage medium 600 can refer to the corresponding descriptions of the memory 420 in the electronic device 400 illustrated in FIG. 25, which will not be repeated here.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A signal processing method for a display apparatus, wherein the display apparatus comprises a display substrate, the display substrate comprises M rows and N columns of pixel units arranged in an array, and the signal processing method comprises:

acquiring display data of a frame of an image to be displayed, wherein the display data comprise P rows and Q columns of pixel data arranged in an array;

generating P rows of gate scan signals corresponding to the P rows of pixel data;

in a case where P is less than M, generating M-P rows of supplementary gate scan signals based on the P rows of gate scan signals, wherein the P rows of gate scan signals and the M-P rows of supplementary gate scan signals form M rows of gate scan signals; and driving the M rows of pixel units using the M rows of gate scan signals, respectively, wherein P, Q, M and N are all positive integers, , and the signal processing method further comprises:

performing a data supplement operation in a case where Q is less than N, wherein the data supplement operation comprises:

generating N-Q columns of supplementary pixel data based on the Q columns of pixel data, wherein the Q columns of pixel data and the N-Q columns of supplementary pixel data form N columns of pixel data;

generating N columns of analog data signals based on the N columns of pixel data; and inputting the N columns of analog data signals respectively into the N columns of pixel units.

2. The signal processing method according to claim 1, wherein in a case where M=A*P, generating M-P rows of supplementary gate scan signals based on the P rows of gate scan signals comprises:

generating A-1 rows of supplementary gate scan signals between every two adjacent rows of gate scan signals in the P rows of gate scan signals; and generating A-1 rows of gate scan signals on at least one side of the P rows of gate scan signals, wherein A is an integer greater than 1.

3. The signal processing method according to claim 1, wherein the P rows of gate scan signals comprise an i-th row of gate scan signal and a (i+1)-th row of gate scan signal that are adjacent to each other;

generating M-P rows of supplementary gate scan signals based on the P rows of gate scan signals comprises:

generating, based on a timing of the i-th row of gate scan signal and the (i+1)-th row of gate scan signal, B rows of supplementary gate scan signals between the i-th row of gate scan signal and the (i+1)-th row of gate scan signal, wherein rising edges of the B rows of supplementary gate scan signals are all between a rising edge of the i-th row of gate scan signal and a rising edge of the (i+1)-th row of gate scan signal in timing, and falling edges of the B rows of supplementary gate scan signals are all between a falling edge of the i-th row of gate scan signal and a falling edge of the (i+1)-th row of gate scan signal in timing; and i is a positive integer less than P, and B is a positive integer less than or equal to M-P.

4. The signal processing method according to claim 3, wherein the rising edge of the i-th row of gate scan signal, the rising edges of the B rows of supplementary gate scan signals and the rising edge of the (i+1)-th row of gate scan signal are sequentially delayed in timing; and the falling edge of the i-th row of gate scan signal, the falling edges of the B rows of supplementary gate scan signals and the falling edge of the (i+1)-th row of gate scan signal are sequentially delayed in timing.

5. The signal processing method according to claim 3, wherein generating, based on the timing of the i-th row of gate scan signal and the (i+1)-th row of gate scan signal, B rows of supplementary gate scan signals between the i-th row of gate scan signal and the (i+1)-th row of gate scan signal, comprises:

performing an interpolation operation on a phase of the i-th row of gate scan signal and a phase of the (i+1)-th row of gate scan signal to obtain phases of the B rows of supplementary gate scan signals.

6. The signal processing method according to claim 3, wherein a time difference between a rising edge and a falling edge of each row of supplementary gate scan signal in the B rows of supplementary gate scan signals is identical to a time difference between the rising edge and the falling edge of the i-th row of gate scan signal.

7. The signal processing method according to claim 1, wherein each of the pixel units comprises S sub-pixels, S sub-pixels comprised in a same pixel unit are arranged along a row direction, and the N columns of pixel units comprise N*S columns of sub-pixels;

sub-pixels in a same column have a same polarity during a display time of a frame of an image to be displayed; and S is a positive integer.

8. The signal processing method according to claim 1, further comprising:

driving the M rows of pixel units using the P rows of gate scan signals, respectively, in a case where P is equal to M.

9. The signal processing method according to claim 1, wherein the display apparatus further comprises N data signal lines respectively connected to the N columns of pixel units;

the signal processing method further comprises:

generating P rows of analog data signals based on the P rows of pixel data respectively, wherein the P rows of analog data signals comprise an i-th row of analog data signals, and the i-th row of analog data signals comprise Q analog data signals; and inputting the Q analog data signals of the i-th row of analog data signals respectively into Q data signal lines of the N data signal lines, during a time period starting from a time when data writing switches of a corresponding row of pixel units are driven on using the i-th row of gate scan signal to a time before data writing switches of a corresponding row of pixel units are driven on using the (i+1)-th row of gate scan signal.

10. The signal processing method according to claim 9, wherein each of the pixel units comprises S sub-pixels, the N columns of pixel units comprise N*S columns of sub-pixels, and the N data signal lines comprise N*S sub-data signal lines respectively connected to the N*S columns of sub-pixels;

each of the analog data signals comprises S sub-analog data signals, and the Q analog data signals comprise Q*S sub-analog data signals; and inputting the Q analog data signals of the i-th row of analog data signals respectively into Q data signal lines of the N data signal lines, comprises:

inputting the Q*S sub-analog data signals respectively into Q*S sub-data signal lines among the N*S sub-data signal lines.

11. The signal processing method according to claim 1, wherein in a case where N=C*Q, generating N-Q columns of supplementary pixel data based on the Q columns of pixel data comprises:

generating C-1 columns of supplementary pixel data between every two adjacent columns of pixel data in the Q columns of pixel data; and generating C-1 columns of supplementary pixel data on at least one side of the Q columns of pixel data, wherein C is an integer greater than 1.

12. The signal processing method according to claim 1, wherein the Q columns of pixel data comprise a j-th column of pixel data and a (j+1)-th column of pixel data that are adjacent to each other; and generating N-Q columns of supplementary pixel data based on the Q columns of pixel data comprises:

performing an interpolation operation on the j-th column of pixel data and the (j+1)-th column of pixel data to generate D columns of supplementary pixel data between the j-th column of pixel data and the (j+1)-th column of pixel data, wherein j is a positive integer less than Q, and D is a positive integer less than or equal to N-Q.

13. The signal processing method according to claim 1, further comprising:

in a case where Q is equal to N, generating Q columns of analog data signals respectively based on the Q columns of pixel data, wherein the Q columns of analog data signals are configured to be respectively input into the N columns of pixel units.

14. The signal processing method according to claim 12, further comprising:

determining whether display data of a plurality of consecutive frames of images to be displayed conforms to an alternating display rule, wherein Q columns of pixel data of the display data conforming to the alternating display rule cycle between g pixel values, and the g pixel values correspond to g luminance features, respectively; and if yes, dividing the plurality of frames of images to be displayed into a plurality of image groups, wherein each image group comprises adjacent g frames of images to be displayed, and following operations are performed for each image group:

if a current frame of an image to be displayed is a k-th frame of an image to be displayed of the image group, transforming all Q columns of pixel data of the k-th frame of an image to be displayed to a k-th pixel value in the g pixel values;

performing the data supplement operation for the Q columns of pixel data that are transformed;

generating an analog data signal based on a (k+n*g)-th column of pixel data after the data supplement operation and inputting the analog data signal into a (k+n*g)-th column of pixel units to cause the (k+n*g)-th column of pixel units to be displayed as a k-th luminance feature in the g luminance features, wherein in a case where k is a positive integer greater than 1, remaining columns of pixel units other than the (k+n*g)-th column of pixel units are displayed as luminance features corresponding to a previous frame of an image to be displayed of the k-th frame of the image to be displayed; and in a case where k is equal to 1, the remaining columns of pixel units other than the (k+n*g)-th column of pixel units are not displayed, wherein n takes all integers from 0 to [Q/g−1], g is an integer greater than 1 and less than Q, and k is an integer less than or equal to g.

15. An electronic device, comprising:

a processor;

a memory, comprising one or more computer program modules, wherein the one or more computer program modules are stored in the memory and are configured to be executed by the processor, and the one or more computer program modules comprise instructions for implementing the signal processing method according to claim 1.

16. A computer-readable storage medium, storing non-transitory computer-readable instructions, wherein the non-transitory computer-readable instructions are capable of being executed by a computer to implement the signal processing method according to claim 1.

17. A display apparatus, comprising:

a display substrate, comprising M rows and N columns of pixel units arranged in an array; and a timing controller, comprising a data receiving module and a gate signal generation module, wherein the data receiving module is configured to acquire display data of a frame of an image to be displayed, and the display data comprise P rows and Q columns of pixel data arranged in an array;

the gate signal generation module is configured to:

generate P rows of gate scan signals corresponding to the P rows of pixel data; and perform a gate signal supplement operation in a case where P is less than M, wherein the gate signal supplement operation comprises generating M-P rows of supplementary gate scan signals based on the P rows of gate scan signals, and the P rows of gate scan signals and the M-P rows of supplementary gate scan signals form M rows of gate scan signals to drive the M rows of pixel units using the M rows of gate scan signals, respectively; and P, Q, M and N are all positive integers, wherein the display apparatus further comprises:

a source driver chip, connected to the M rows and N columns of pixel units through a plurality of data signal lines extending along a second direction intersecting with a first direction to provide analog data signals to the M rows and N columns of pixel units, wherein the source driver chip is configured to perform a data supplement operation in a case where Q is less than N, and the data supplement operation comprises:

generating N-Q columns of supplementary pixel data based on the Q columns of pixel data, wherein the Q columns of pixel data and the N-Q columns of supplementary pixel data form N columns of pixel data;

generating N columns of analog data signals based on the N columns of pixel data; and inputting the N columns of analog data signals respectively into the N columns of pixel units;

wherein the source driver chip further comprises:

a buffer module, configured to buffer the display data;

a plurality of operation modules, configured to perform the data supplement operation to obtain the N-Q columns of supplementary pixel data;

a plurality of digital-to-analog conversion modules, configured to convert the N columns of pixel data into the N columns of analog data signals;

a plurality of two-way switches, wherein each of the plurality of two-way switches comprises an input terminal and two output terminals, the input terminal is connected to the buffer module for receiving a column of pixel data, one of the two output terminals is connected to at least one of the plurality of digital-to-analog conversion modules, and the other of the two output terminals is connected to at least one of the plurality of operation modules; and a mode switching module, configured to control the two-way switch to output the column of pixel data to one of the two output terminals based on a control signal sent by the mode control module wherein the timing controller further comprises:

a mode control module, configured to receive a mode instruction, and send a control signal to the gate signal generation module and/or the source driver chip based on the mode instruction to control whether the gate signal generation module performs the gate signal supplement operation and/or control whether the source driver chip performs the data supplement operation;

an image recognition module, and the image recognition module is configured to:

recognize whether display data of a plurality of consecutive frames of images to be displayed conforms to an alternating display rule, wherein Q columns of pixel data of the display data conforming to the alternating display rule cycle between g pixel values, and the g pixel values correspond to g luminance features, respectively; and if yes, divide the plurality of frames of images to be displayed into a plurality of image groups, wherein each image group comprises adjacent g frames of images to be displayed, and following operations are performed for each image group: if a current frame of an image to be displayed is a k-th frame of an image to be displayed of the image group, transform all Q columns of pixel data of the k-th frame of an image to be displayed to a k-th pixel value in the g pixel values; and output the Q columns of pixel data that are transformed to the source driver chip;

wherein the source driver chip is further configured to:

perform the data supplement operation for the Q columns of pixel data that are transformed; and generate an analog data signal based on a (k+n*g)-th column of pixel data after the data supplement operation and input the analog data signal into a (k+n*g)-th column of pixel units to cause the (k+n*g)-th column of pixel units to be displayed as a k-th luminance feature in the g luminance features, wherein in a case where k is a positive integer greater than 1, remaining columns of pixel units other than the (k+n*g)-th column of pixel units are displayed as luminance features corresponding to a previous frame of an image to be displayed of the k-th frame of the image to be displayed; and in a case where k is equal to 1, the remaining columns of pixel units other than the (k+n*g)-th column of pixel units are not displayed, wherein n takes all integers from 0 to [Q/g−1], g is an integer greater than 1 and less than Q, and k is an integer less than or equal to g.

18. An electronic device, comprising the display apparatus according to claim 17.

* * * * *